(12) United States Patent
Tucker et al.

(10) Patent No.: US 7,027,743 B1
(45) Date of Patent: Apr. 11, 2006

(54) SYSTEM AND METHOD FOR OPTICAL HETERODYNE DETECTION OF AN OPTICAL SIGNAL INCLUDING OPTICAL PRE-SELECTION THAT IS ADJUSTED TO ACCURATELY TRACK A LOCAL OSCILLATOR SIGNAL

(75) Inventors: Rodney S. Tucker, Hawthron (AU); Douglas M. Baney, Los Altos, CA (US); Wayne V. Sorin, Mountain View, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 917 days.

(21) Appl. No.: 09/684,371

(22) Filed: Oct. 5, 2000

(51) Int. Cl.
*H04B 10/06* (2006.01)
*H04B 10/148* (2006.01)

(52) U.S. Cl. .................................... 398/204; 356/484

(58) Field of Classification Search ............... 398/204, 398/205, 206, 207, 116, 136, 139, 202, 208, 398/209, 213, 69, 76, 9, 91, 95; 250/205, 250/214 R, 227.43; 324/76.23; 331/9; 340/825.7; 341/155; 345/440; 356/454, 478, 484, 519; 359/337.2; 372/18, 20; 385/24, 37; 455/182.1, 455/317

See application file for complete search history.

(56) References Cited

U.S. PATENT DOCUMENTS

| 3,641,515 | A | * | 2/1972 | Sues ........................... 702/76 |
| 5,552,919 | A | | 9/1996 | Majima et al. ............. 398/213 |
| 5,579,143 | A | | 11/1996 | Huber |
| 5,589,970 | A | | 12/1996 | Lyu et al. ...................... 398/95 |
| 6,115,162 | A | * | 9/2000 | Graves et al. .............. 398/116 |
| 6,208,850 | B1 | * | 3/2001 | Tolson ......................... 455/317 |
| 6,535,289 | B1 | * | 3/2003 | Baney et al. ................ 356/484 |

FOREIGN PATENT DOCUMENTS

| EP | 0491421 A | 6/1992 |
| GB | 2213026 A | 8/1989 |

\* cited by examiner

*Primary Examiner*—Agustin Bello
*Assistant Examiner*—David S. Kim

(57) ABSTRACT

An optical heterodyne detection system includes a tunable optical pre-selector that is adjusted to track the frequency of a swept local oscillator signal. The tunable optical pre-selector is adjusted in response to a measure of the frequency of the swept local oscillator signal and in response to a measure of a portion of the swept local oscillator signal after the portion of the swept local oscillator signal has optically interacted with the optical pre-selector. In an embodiment, at least some portion of the swept local oscillator signal is modulated before it interacts with the optical pre-selector. In an embodiment, the portion of the swept local oscillator signal that interacts with the pre-selector is detected and used in a feedback control circuit to generate a control signal which causes the error between the center frequency of the pre-selector and the frequency of the swept local oscillator signal to be small.

7 Claims, 16 Drawing Sheets

| Modulate at Least Some Portion of the Swept Local Oscillator Signal | 2014 |

| Dither a Filter Passband for One of the Combined Optical Signal, the Input Signal, and the Swept Local Oscillator Signal | 2016 |

SYSTEM AND METHOD FOR OPTICAL HETERODYNE DETECTION OF AN OPTICAL SIGNAL INCLUDING OPTICAL PRE-SELECTION THAT IS ADJUSTED TO ACCURATELY TRACK A LOCAL OSCILLATOR SIGNAL

FIELD OF THE INVENTION

The invention relates generally to the field of optical measurements and measuring systems, and more particularly to a system and method for optical heterodyne detection of an optical signal.

BACKGROUND OF THE INVENTION

Dense wavelength division multiplexing (DWDM) requires optical spectrum analyzers (OSAs) that have higher spectral resolution than is typically available with current OSAs. For example, grating-based OSAs and autocorrelation-based OSAs encounter mechanical constraints, such as constraints on beam size and the scanning of optical path lengths, which limit the resolution that can be obtained.

As an alternative to grating-based and autocorrelation-based OSAs, optical heterodyne detection systems can be utilized to monitor DWDM systems. FIG. 1 is a depiction of a prior art optical heterodyne detection system. The optical heterodyne detection system includes an input signal 102, an input waveguide 104, a local oscillator source 105, a local oscillator signal 106, a local oscillator waveguide 108, an optical coupler 110, an output waveguide 118, a photodetector 112, and a signal processor 116. The principles of operation of optical heterodyne detection systems are well known in the field of optical heterodyne detection and involve monitoring the heterodyne term that is generated when an input signal is combined with a local oscillator signal. The heterodyne term coexists with other direct detection signals, such as intensity noise from the input signal and intensity noise from the local oscillator signal.

Optical heterodyne detection systems are not limited by the mechanical constraints that limit the grating based and autocorrelation based OSAs. The spectral resolution of an optical heterodyne system is limited by the linewidth of the local oscillator signal, which can be several orders of magnitude narrower than the resolution of other OSAs.

In order to improve the performance of optical heterodyne detection systems with regard to parameters such as sensitivity and dynamic range, it is best for the heterodyne signal to have a high signal-to-noise ratio. However, the signal-to-noise ratio of the heterodyne signal is often degraded by noise that is contributed from the direct detection signals, especially in the DWDM case where the input signal includes closely spaced carrier wavelengths. One technique for improving the signal-to-noise ratio of the heterodyne signal, as described in U.S. Pat. No. 4,856,899, involves amplifying the input signal before the input signal is combined with the local oscillator signal in order to increase the amplitude of the heterodyne signal. Although amplifying the input signal increases the amplitude of the heterodyne signal, the amplification also increases the intensity noise of the input signal and may not improve the signal-to-noise ratio of the heterodyne signal.

In view of the prior art limitations in optical heterodyne detection systems, what is needed is an optical heterodyne detection system that generates a heterodyne signal with an improved signal-to-noise ratio.

SUMMARY OF THE INVENTION

An optical heterodyne detection system includes a tunable optical pre-selector that is adjusted to track the frequency of a swept local oscillator signal. More specifically, the invention relates to a method and system for ensuring that the tunable optical pre-selector accurately tracks the frequency (or wavelength) of the local oscillator signal as the local oscillator signal sweeps across a range of frequencies. The method and system for ensuring that the tunable optical pre-selector accurately tracks the frequency of the swept local oscillator signal involves adjusting the optical pre-selector in response to a measure of the frequency of the swept local oscillator signal and in response to a measure of a portion of the swept local oscillator signal after the portion of the swept local oscillator signal has optically interacted with the optical pre-selector.

In an embodiment, at least some portion of the swept local oscillator signal is modulated before it interacts with the optical pre-selector. In another embodiment, the center frequency (or wavelength) of the optical pre-selector is dithered such that a dither is imparted on the portion of the swept local oscillator signal that interacts with the optical pre-selector. Both embodiments of the optical heterodyne detection system enable the center frequency of the optical pre-selector to be determined from the interaction between the optical pre-selector and the portion of the swept local oscillator. Details of the frequency tracking technique depend on whether an input signal is filtered before it is combined with the swept local oscillator signal or filtered after the input signal is combined with the swept local oscillator signal. Adjusting the optical pre-selector of the optical heterodyne detection system in response to a measure of the frequency of the swept local oscillator signal and in response to a measure of a portion of the swept local oscillator signal after the portion of the swept local oscillator signal has optically interacted with the optical pre-selector allows the optical pre-selector to accurately track the frequency of the swept local oscillator signal, thereby reducing noise that is contributed from WDM signals and increasing the dynamic range of the optical heterodyne detection system.

An embodiment of the optical heterodyne detection system includes an optical combining unit, a photodetector, an optical pre-selector, a controller, and a modulator for modulating at least some portion of the swept local oscillator signal. In the embodiment, the modulated portion of the swept local oscillator signal is passed through the optical pre-selector. The intensity and phase of the modulated portion of the swept local oscillator signal are detected by the controller and utilized to generate an error signal that represents the offset between the center frequency of the optical pre-selector and the frequency of the swept local oscillator signal. The controller then adjusts the optical pre-selector in response to the frequency of the swept local oscillator signal and in response to the error signal to drive the center frequency of the optical pre-selector to the frequency of the local oscillator signal.

When the optical pre-selector is located after the optical combining unit, the optical heterodyne detection system includes a tap for diverting the portion of the modulated and filtered swept local oscillator signal to the controller. When the optical pre-selector is located before the optical combining unit, the optical heterodyne detection system includes an optical tap for diverting the portion of the swept local oscillator signal that is to be modulated. The diverted portion of the swept local oscillator signal is also delayed by a signal delay unit and then interacted with the optical pre-selector. The optical heterodyne detection system may also include either or both a frequency counter for measuring the frequency of the swept local oscillator signal and a clock source for controlling the timing of signal modulation caused by the modulator.

Another embodiment of the optical heterodyne detection system includes an optical combining unit, a photodetector, an optical pre-selector, and a controller that causes the center frequency (or wavelength) of the optical pre-selector passband to be dithered. In the embodiment, at least some portion of the swept local oscillator signal is passed through the dithered optical pre-selector and the dithering of the optical pre-selector imparts a dither on the filtered portion of the swept local oscillator signal that is output from the optical pre-selector. The intensity and phase of the dithered portion of the swept local oscillator signal are detected by the controller and utilized to generate an error signal that represents the offset between the center frequency of the optical pre-selector and the frequency of the swept local oscillator signal. The controller then adjusts the optical pre-selector in response to the frequency of the swept local oscillator signal and in response to the error signal.

When the optical pre-selector is located after the optical combining unit, the optical heterodyne detection system includes a tap for diverting the portion of the dithered and filtered swept local oscillator signal to the controller. When the optical pre-selector is located before the optical combining unit, the optical heterodyne detection system includes an optical tap for diverting the portion of the swept local oscillator signal that is to be dithered by the optical pre-selector. The tapped portion of the swept local oscillator signal is also delayed by a signal delay unit and then interacted with the optical pre-selector. The optical heterodyne detection system may also include either or both a frequency counter for measuring the frequency of the swept local oscillator signal and a clock source for controlling the generation of the local oscillator signal and the dithering of the optical pre-selector.

A method for monitoring an optical signal utilizing an optical heterodyne detection system involves combining the input signal and the swept local oscillator signal to create a combined optical signal and outputting the combined optical signal. An electrical signal is generated in response to the combined optical signal and the electrical signal is processed to determine an optical characteristic represented by the input signal. One of the combined optical signal, the input signal, and the swept local oscillator signal is filtered to pass a frequency band that tracks the frequency of the swept local oscillator signal and the filtering is adjusted in response to a measure of the frequency of the swept local oscillator signal and in response to a measure of a portion of the swept local oscillator signal after the portion of the swept local oscillator signal has been filtered.

In an embodiment of the method, at least some portion of the swept local oscillator signal is modulated before being filtered. The modulated portion of the swept local oscillator signal is then filtered and the intensity and phase of the filtered and modulated portion of the swept local oscillator signal are utilized to generate an error signal that represents the offset between the center frequency of the optical pre-selector and the frequency of the swept local oscillator signal. When the input signal and the swept local oscillator signal are combined before filtering, an embodiment of the method includes tapping a portion of the filtered combined optical signal and forwarding the tapped portion of the filtered combined optical signal for use in tracking the frequency of the swept local oscillator signal. When the input signal is filtered before the input signal and the swept local oscillator signal are combined, an embodiment of the method includes tapping a portion of the swept local oscillator signal, modulating the tapped portion of the swept local oscillator signal, delaying the tapped portion of the swept local oscillator signal relative to the untapped portion of the swept local oscillator signal, and then filtering the modulated and delayed portion of the swept local oscillator signal.

In another embodiment of the method, the center frequency of the optical pre-selector is dithered. The intensity and phase of the dithered portion of the swept local oscillator signal that passes through the optical pre-selector are then utilized to generate an error signal that represents the offset between the center frequency of the optical pre-selector and the frequency of the swept local oscillator signal. The optical heterodyne detection system and method provide an optical measurement system that has a high signal-to-noise ratio over a wide range of optical wavelengths. The optical heterodyne detection system and method can be utilized for optical spectrum analysis to characterize an unknown input signal. The optical heterodyne detection system and method may also be utilized for optical network analysis or optical component analysis in which a known signal is input into an optical network or an optical component and the output signal is measured.

Other aspects and advantages of the present invention will become apparent from the following detailed description, taken in conjunction with the accompanying drawings, illustrating by way of example the principles of the invention.

DETAILED DESCRIPTION OF THE INVENTION

A method and system for ensuring that the tunable optical pre-selector accurately tracks the frequency of the swept local oscillator signal involves adjusting the optical pre-selector in response to a measure of the frequency of the swept local oscillator signal and in response to a measure of a portion of the swept local oscillator signal after the portion of the swept local oscillator signal has optically interacted with the optical pre-selector. In an embodiment, at least some portion of the swept local oscillator signal is modulated before it interacts with the optical pre-selector. In another embodiment, the optical pre-selector is dithered such that a dither is imparted on the portion of the swept local oscillator signal that interacts with the optical pre-selector. Both embodiments of the optical heterodyne detection system enable the generation of an error signal that represents the offset between the center frequency of the optical pre-selector and the frequency of the swept local oscillator signal. The error signal is used to drive the center frequency of the optical pre-selector to the frequency of the swept local oscillator signal. Details of the frequency tracking technique depend on whether filtering occurs after the input signal is combined with the swept local oscillator signal or before the input signal is combined with the swept local oscillator signal. Embodiments of optical heterodyne detection systems in which filtering occurs after the input signal is combined with the swept local oscillator signal are described first with reference to FIGS. 2–11 and embodiments of optical heterodyne detection systems in which filtering occurs before the input signal is combined with the swept local oscillator signal are described second with reference to FIGS. 12–19. Methods for optical heterodyne detection in accordance with the invention are described with reference to FIGS. 20, 20A, and 20B.

Figure 1:
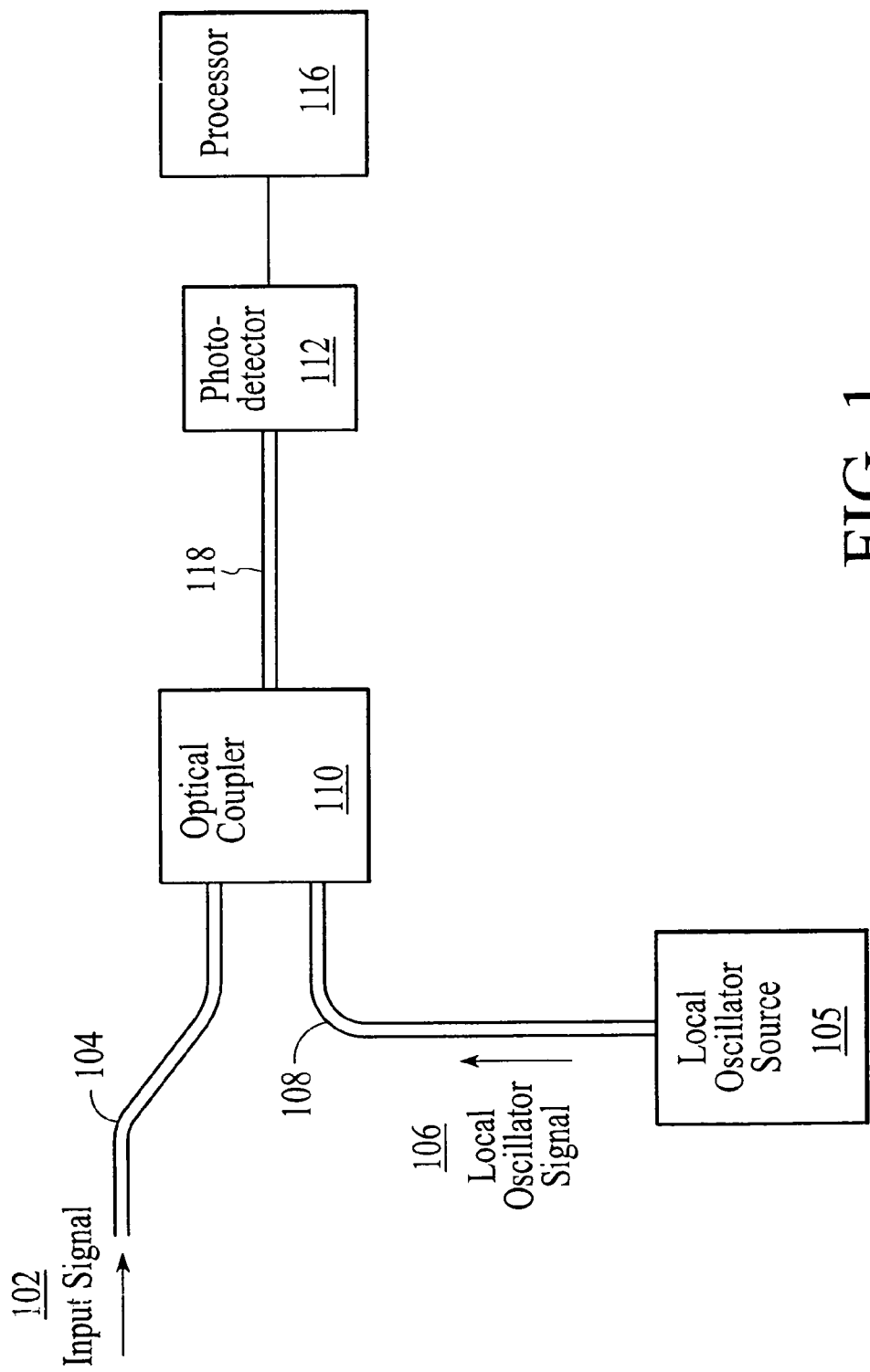
FIG. 1 is a depiction of an optical heterodyne detection system in accordance with the prior art.
Figure 2:
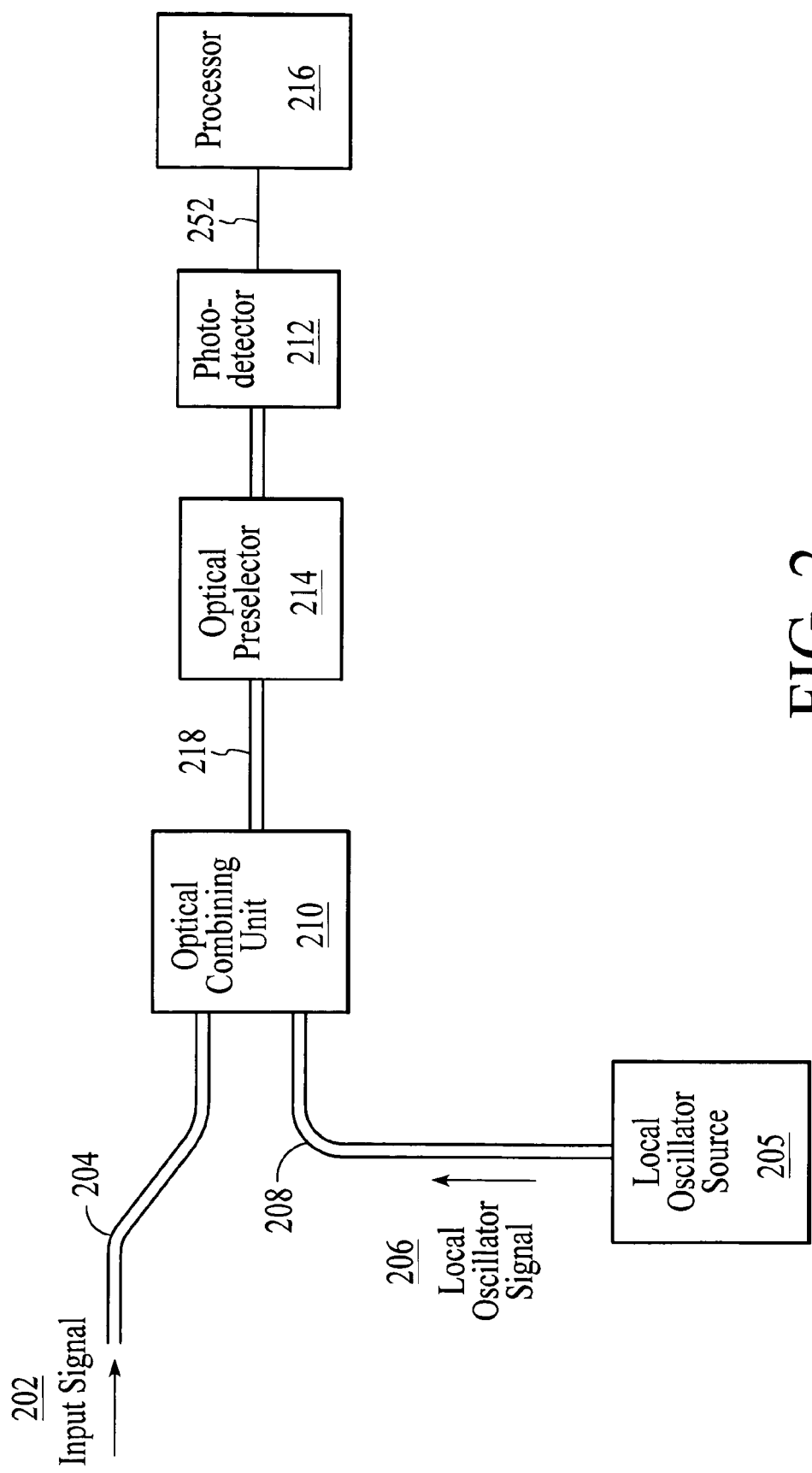
FIG. 2 is a depiction of an optical heterodyne detection system that includes an optical combining unit, an optical pre-selector, and a photodetector where an input signal is combined with a swept local oscillator signal before optical filtering.

FIG. 2 depicts an embodiment of an optical heterodyne detection system in which the input signal and swept local oscillator signal are filtered after the two signals have been combined. The optical heterodyne detection system of FIG. 2 includes an input signal 202, a signal fiber 204, a local oscillator source 205, a local oscillator signal 206, a local oscillator fiber 208, an optical combining unit 210, an optical pre-selector 214, a photodetector 212, and a processor 216. It should be noted that throughout the description similar reference numerals are utilized to identify similar elements.

The input signal 202 and the local oscillator signal 206 include optical signals that are generated from conventional devices as is known in the field of optical communications systems. For example, the input signal and the local oscillator signal may be generated by lasers. The input signal may consist of a single frequency or the input signal may include multiple frequencies as is known in the field of frequency division multiplexing. The input signal may be an optical signal having unknown optical characteristics, in which case the optical heterodyne detection system can be utilized for optical spectrum analysis. The input signal may alternatively be a delayed portion of the local oscillator signal that is utilized for optical network analysis or optical component analysis. When the monitoring system is being utilized for optical network or component analysis, the characteristics of a network or a single network component can be determined by inputting a known input signal, such as a fraction of the local oscillator signal, into the network or the single network component and then measuring the response to the known signal.

The signal fiber 204 forms an optical path for carrying the input signal 202 that is to be detected by the system. In an embodiment, the signal fiber is a single mode optical fiber as is known in the art, although other optical waveguides may be utilized to form an optical path. In addition, although waveguides are described, optical signals may be input into the system, or transmitted within the system, in free space.

The local oscillator source 205 generates the local oscillator signal 206. In an embodiment, the local oscillator source is a wideband tunable laser that is tunable over a range of one nanometer or greater. During optical spectrum analysis, the local oscillator signal is typically swept across a range of frequencies in order to detect the input signal 202 over the range of frequencies.

The local oscillator fiber 208 is an optical fiber, such as a single mode optical fiber, that forms an optical path for carrying the local oscillator signal 206. The local oscillator fiber may include a polarization controller (not shown) that controls the polarization state of the local oscillator signal. Other optical waveguides may be utilized in place of single mode optical fiber to form an optical path, such as polarization preserving fiber. Alternatively, the local oscillator signal may be transmitted through free space without the use of a waveguide.

The optical combining unit 210 optically combines the input signal 202 and the local oscillator signal 206 into a combined optical signal and outputs at least one beam of the combined optical signal into an optical path that is formed by output fiber 218. The combined optical signal includes the heterodyne signal and intensity noise from the input signal and from the local oscillator signal. In an embodiment, the input signal and the local oscillator signal are combined in a manner that ensures the spatial overlap of the input signal and the local oscillator signal, thereby allowing full interference between the input signal and the local oscillator signal.

In an embodiment, the optical combining unit includes an optical coupler that outputs the combined optical signal into one optical path. The optical coupler may be an optically directional 3 dB fiber coupler, although other optical couplers may be utilized. In an embodiment, coupling of the optical signals is substantially independent of the polarization of optical signals. In an embodiment, the optical coupler does not polarize the combined optical signal. Although the optical combining unit is described below as outputting one beam of the combined optical signal, it should be understood that embodiments of the optical combining unit that output more than one beam of the combined optical signal are possible.

The optical pre-selector 214 is a tunable bandpass filter that is tuned to track the swept local oscillator signal 206. That is, the optical pre-selector is tuned so that the optical pre-selector has the highest optical transmission at a frequency that is related to the frequency of the swept local oscillator signal. As stated above, techniques for tuning the optical pre-selector to track the swept local oscillator signal are the focus of the invention and are described in detail below after the description of the basic function of the optical heterodyne detection system. Tunable optical pre-selectors, such as those described with reference to all of the following embodiments are well known in the field of optical communications and can be implemented utilizing components such as diffraction gratings, dielectric interference filters, periodic Bragg devices, such as tunable fiber Bragg gratings, Fabry-Perot interferometers, and other known interferometers.

In an embodiment, the center of the filter passband is tuned to the frequency of the swept local oscillator signal. In another embodiment, the center of the filter passband is tuned slightly off the local oscillator frequency in order to generate the heterodyne signal at a higher frequency, for example, in a situation where image rejection is important.

Figure 3:
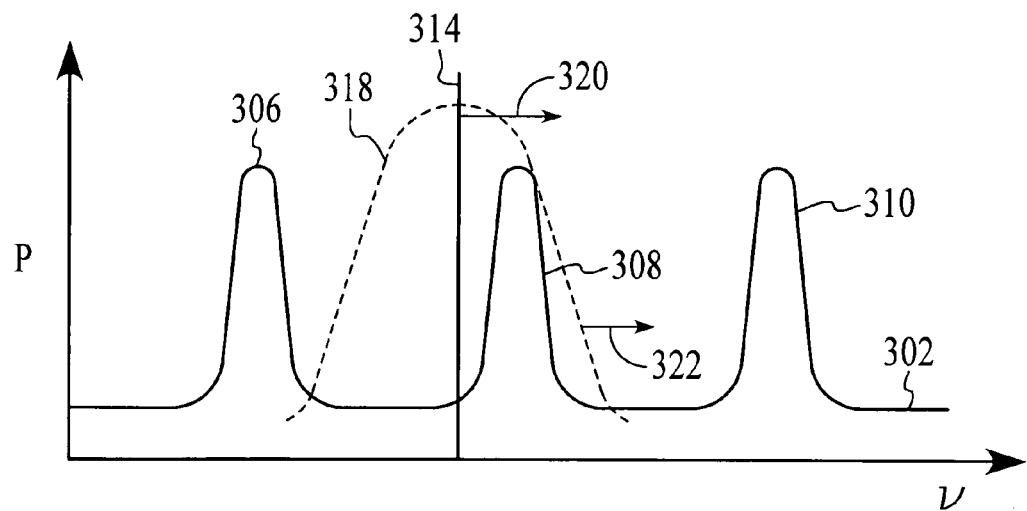
FIG. 3 is a graph of an unfiltered WDM input signal and a swept local oscillator signal in relation to the passband of an optical pre-selector that tracks the swept local oscillator signal.
Figure 4:
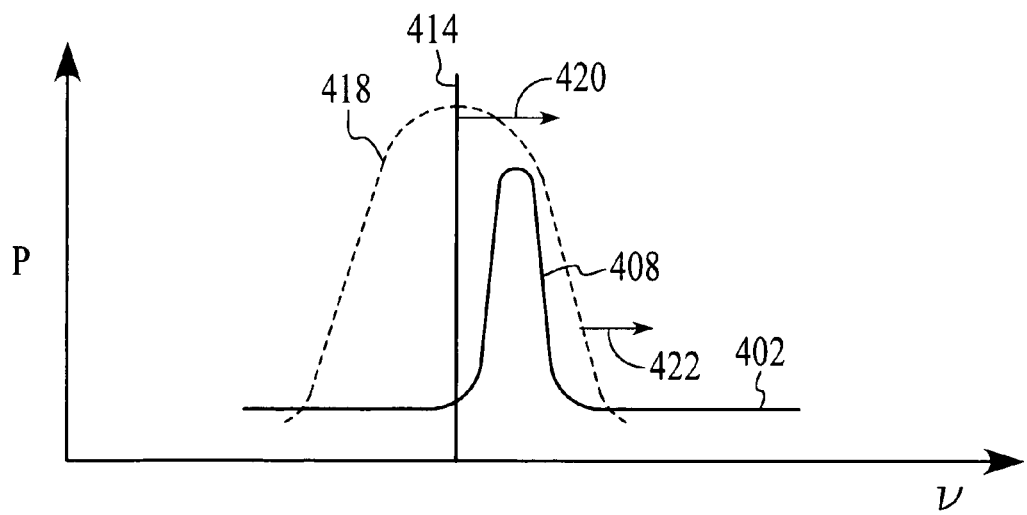
FIG. 4 is a graph of a filtered WDM input signal and a swept local oscillator signal in relation to the passband of an optical pre-selector that tracks the swept local oscillator.

Operation of the optical pre-selector 214 in a WDM system is depicted in the signal power vs. frequency graphs of FIGS. 3 and 4. FIG. 3 depicts an input signal 302 as three optical carriers 306, 308, and 310 in a WDM system in relation to a swept local oscillator signal 314 before the combined input signal and swept local oscillator signal have entered the optical pre-selector. For example purposes, the dashed line 318 represents the passband of the optical pre-selector that is tuned to track the sweep of the local oscillator signals. Optical signals within the passband continue to be transmitted and optical signals outside of the passband are not transmitted. The sweep of the local oscillator signal and the tracking of the optical pre-selector passband are represented by the horizontal arrows 320 and 322 respectively.

FIG. 4 depicts the one optical carrier 408 that exits the optical pre-selector after the optical signals have been filtered. As shown by FIG. 4, the optical pre-selector filters out optical carriers that are not near the frequency of the swept local oscillator signal 414 (i.e., outside the passband of the optical pre-selector). The optical carriers that are not near the frequency of the swept local oscillator signal are not necessary for optical heterodyne detection and only contribute to noise in the detection system if not filtered. Optical bandpass filtering that tracks the frequency of the swept local oscillator signal is especially useful when measuring broadband optical noise, such as amplified spontaneous emissions from an optical amplifier.

Referring back to FIG. 2, the photodetector 212 is aligned to detect the filtered beam that is output from the optical pre-selector 214. The photodetector generates an electrical signal in response to the filtered beam. The electrical signal generated by the photodetector is provided to the processor 216. The connection between the photodetector and the processor is depicted in FIG. 2 by line 252. Although not shown, the photodetector may include additional circuitry such as signal amplifiers and filters, as is known in the field.

The processor 216 receives the electrical signal from the photodetector 212 and processes the electrical signal to determine an optical characteristic represented by the input signal. The processor may include analog signal processing circuitry and/or digital signal processing circuitry as is known in the field of electrical signal processing. In an embodiment, an analog signal from the photodetector is converted into digital signals and the digital signals are subsequently processed. It should be understood that digital signal processing involves converting the electrical signals from the photodetector into digital signals that are representative of the original electrical signal. The combination of the photodetector and the processor forms an optical receiver.

Operation of the optical heterodyne detection system described with reference to FIGS. 2–4 involves combining the input signal 202 and the swept local oscillator signal 206 into a combined optical signal and outputting a beam of the combined optical signal to the optical pre-selector 214. The output beam is then filtered by the optical pre-selector 214. The optical pre-selector passes a frequency band that tracks the swept local oscillator signal. The filtered beam is then detected by the photodetector 212 and the photodetector generates an electrical signal in proportion to the intensity of the filtered beam. The electrical signal generated by the photodetector is then received by the processor 216 and processed to determine an optical characteristic represented by the input signal. The combination of the optical combining unit, the optical pre-selector, and the photodetector creates an optical heterodyne detection system that filters the combined optical signal to reduce noise and improve the dynamic range of the system. Preferably, during operation, the center frequency of the optical pre-selector passband tracks, in real-time, the frequency of the swept local oscillator signal.

Figure 5:
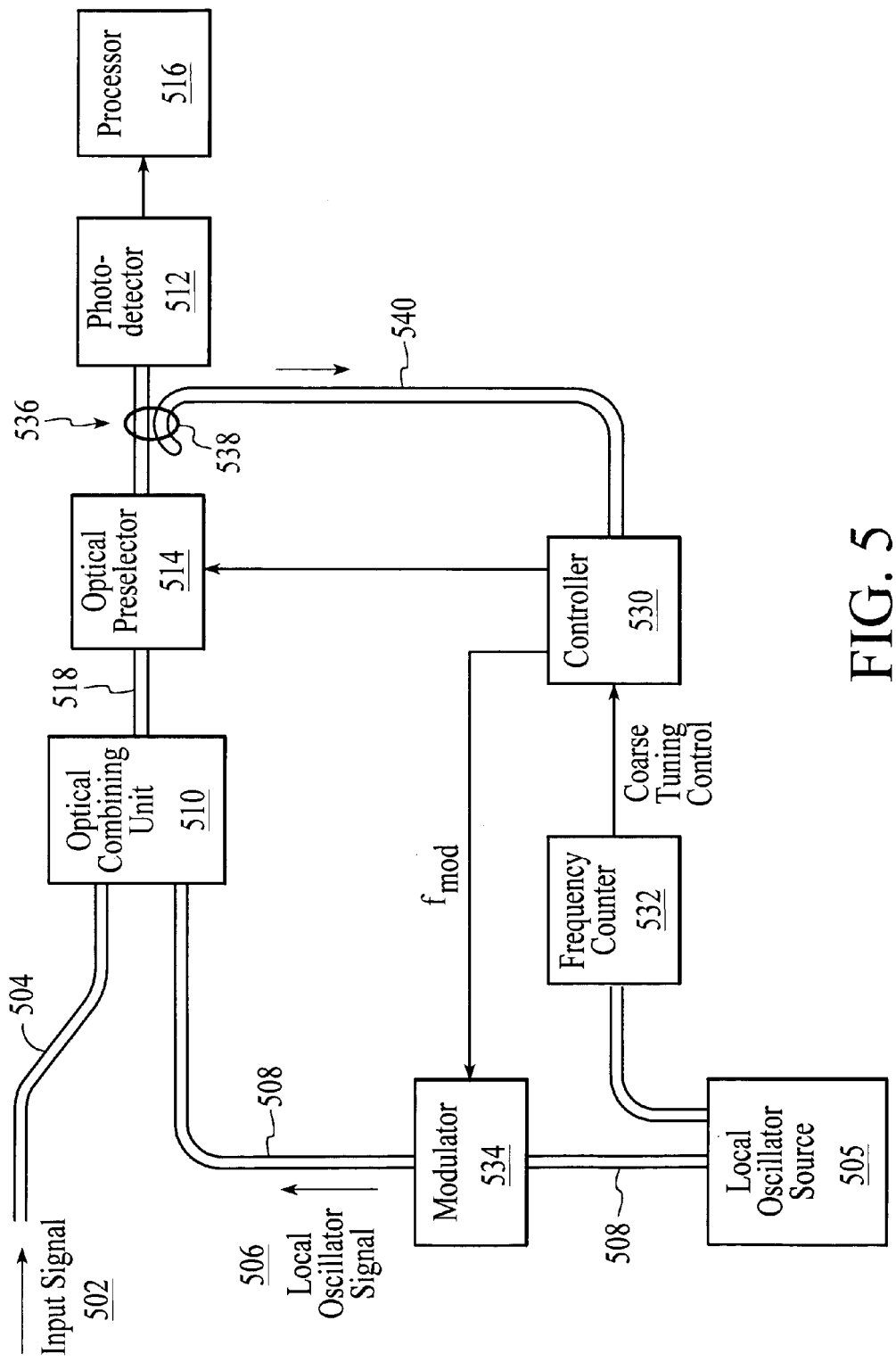
FIG. 5 is a depiction of the optical heterodyne detection system of FIG. 2 with an embodiment of a frequency tracking system that utilizes modulation of the swept local oscillator signal to determine the offset between the center frequency of the optical pre-selector and the frequency of the swept local oscillator signal in accordance with an embodiment of the invention.

FIG. 5 is a depiction of the optical heterodyne detection system of FIG. 2 with an embodiment of a frequency tracking system that utilizes modulation of the swept local oscillator signal 506 to determine the center frequency of the optical pre-selector. The frequency tracking system includes a controller 530, a frequency counter 532, a modulator 534, and an optical signal tap 536. Each element of the frequency tracking system is described individually below followed by a description of the system operation relative to the operation of the overall optical heterodyne detection system.

The controller 530 is operationally connected to control the center frequency of the passband of the optical pre-selector 514 such that the passband tracks the frequency of the swept local oscillator signal 506. Techniques for physically changing the center frequency of the optical pre-selector are known in the field and are not described further. The controller is connected to receive frequency information from the frequency counter 532 and to receive the tapped portion of the combined optical signal from the optical tap 536. The controller is connected to transmit a frequency control signal ($f_{mod}$) to the modulator and a filter control signal to the optical pre-selector.

The frequency counter 532 is optically connected to measure the frequency (alternatively referred to in terms of wavelength) of the swept local oscillator signal. Preferably, the frequency counter obtains a real-time measure of the frequency of the local oscillator signal as the local oscillator signal sweeps across a range of frequencies. The frequency counter outputs frequency measurement information, through an electrical connection, to the controller 530 for use in frequency tracking. Frequency counters are known in the field of optical communications and are not described further.

The modulator 534 is located along the local oscillator fiber 508 in the optical path of the swept local oscillator signal 506. The modulator directly modulates the swept local oscillator signal in response to signals from the controller. In a preferred embodiment, the modulator is a phase modulator that modulates the swept local oscillator signal at a known modulation frequency ($f_{mod}$) which is substantially larger than the bandwidth of the photodetector 512 and any associated filters. In an embodiment, the modulation frequency ($f_{mod}$) is on the order of 100 MHz to 1 GHz and the photodetector bandwidth is on the order of a few MHz. Phase modulators are known in the field of optical communications and are not described further.

The optical signal tap 536 is located between the optical pre-selector 514 and the photodetector 512. The optical signal tap diverts a portion of the combined optical signal to the controller 530. In an embodiment, the optical signal tap includes an optical coupler 538 and an optical tap fiber 540 as is known in the field. As will become evident, the optical signal tap is located after the optical pre-selector when the pre-selector is used in a transmissive mode, however the optical signal tap may be located near the input of the optical pre-selector if the optical pre-selector is used in a reflective mode.

In operation, the controller 530 transmits a frequency control signal to the modulator 534 causing the swept local oscillator signal to be modulated at a frequency $f_{mod}$. The modulated local oscillator signal is then combined with the input signal as described above with reference to FIG. 2 and the combined optical signal is output to the optical pre-selector 514. The optical pre-selector filters the combined optical signal, passing a frequency band that tracks the frequency of the swept local oscillator signal. A portion of the filtered optical signal that is output from the optical pre-selector is tapped off from the output fiber by the optical signal tap and directed to the controller.

Figure 6:
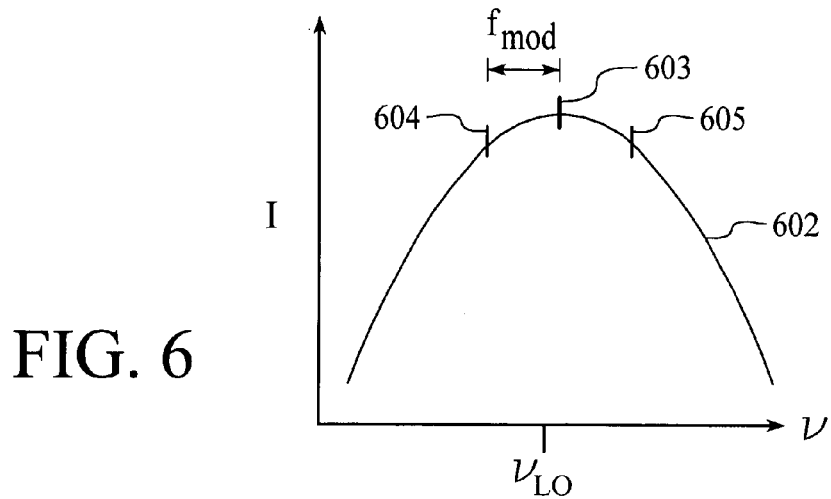
FIG. 6 is a graph of the intensity of a tapped portion of the optical signal from the optical pre-selector of FIG. 5 versus the frequency of the swept local oscillator signal.

Referring to FIG. 6, the controller measures the intensity and phase of the modulated portion of the optical signal that is output from the optical pre-selector. Referring to FIG. 6, the response curve 602 represents the response characteristic of the optical pre-selector. The high point of the response curve represents the center frequency of the optical pre-selector passband. The local oscillator signal ($V_{LO}$) 603 is represented at the top of the response curve (in the case where the local oscillator signal is at the same frequency as the center frequency of the optical pre-selector), and the modulation sidebands 604 and 605 are represented adjacent to the local oscillator signal.

The controller 530 utilizes information related to the real-time frequency of the swept local oscillator signal from the frequency counter 532 and the detected signal from fiber 540 to adjust the center frequency (or passband) of the optical pre-selector to track the frequency (or wavelength) of the swept local oscillator signal. In an embodiment, the measure of the swept local oscillator frequency from the frequency counter is utilized by the controller for coarse tuning of the optical pre-selector and a control signal generated from the modulated optical signal in fiber 540 is utilized by the controller for fine tuning of the optical pre-selector.

Figure 7:
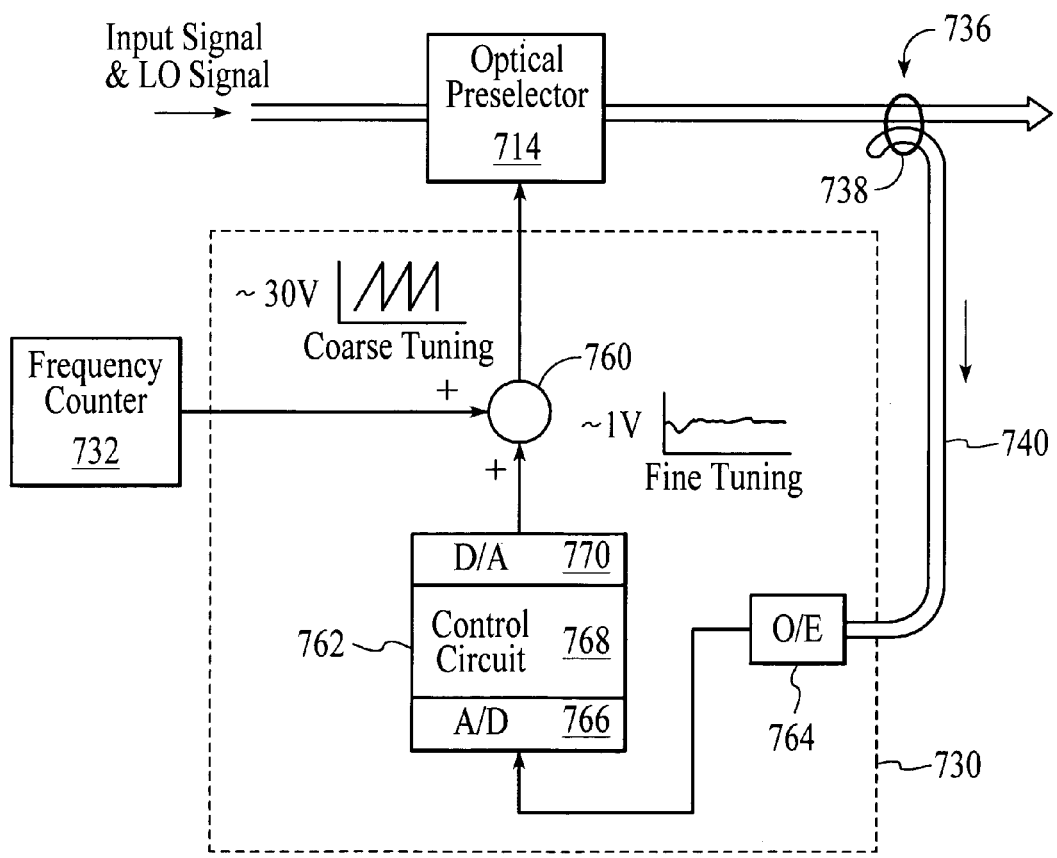
FIG. 7 is an expanded depiction of an embodiment of the controller shown in FIG. 5.

FIG. 7 is an expanded depiction of an embodiment of the controller described with reference to FIG. 5. The controller 730 includes a summing node 760, a fine tuning controller 762, and an optical-to-electrical converter 764, which form a feedback tracking circuit. The optical-to-electrical converter converts the tapped portion of the optical signal into an electrical signal. The fine tuning controller includes an analog-to-digital converter 766, a control circuit 768, and a digital-to-analog converter 770 that are used to determine the amplitude and phase of the electrical signal and to determine the offset between the center frequency of the pre-selector and the frequency of the local oscillator signal. Using techniques well known in the field of optical filtering, the offset between the center frequency of the optical pre-selector and the local oscillator is determined by the control circuit 768 and an error signal related to the offset is generated. The error signal is output from the fine tuning controller and added to the coarse tuning control signal from the frequency counter 732, forcing the offset between the optical pre-selector and the local oscillator signal to be small. By knowing the real-time frequency of the swept local oscillator signal from the frequency counter and using the tapped portion of the modulated local oscillator signal to generate an error signal that indicates the offset between the center frequency of the optical pre-selector and the frequency of the local oscillator, the optical pre-selector can be accurately tuned in real-time, or nearly real-time, to track the frequency (or wavelength) of the swept local oscillator signal. In the embodiment of FIG. 7, the frequency counter provides information for coarse tuning of the pre-selector at a drive voltage that is on the order of 30 volts and the tapped portion of the modulated local oscillator signal provides information for fine tuning of the pre-selector at a drive voltage that is on the order of 1 volt.

Figure 8:
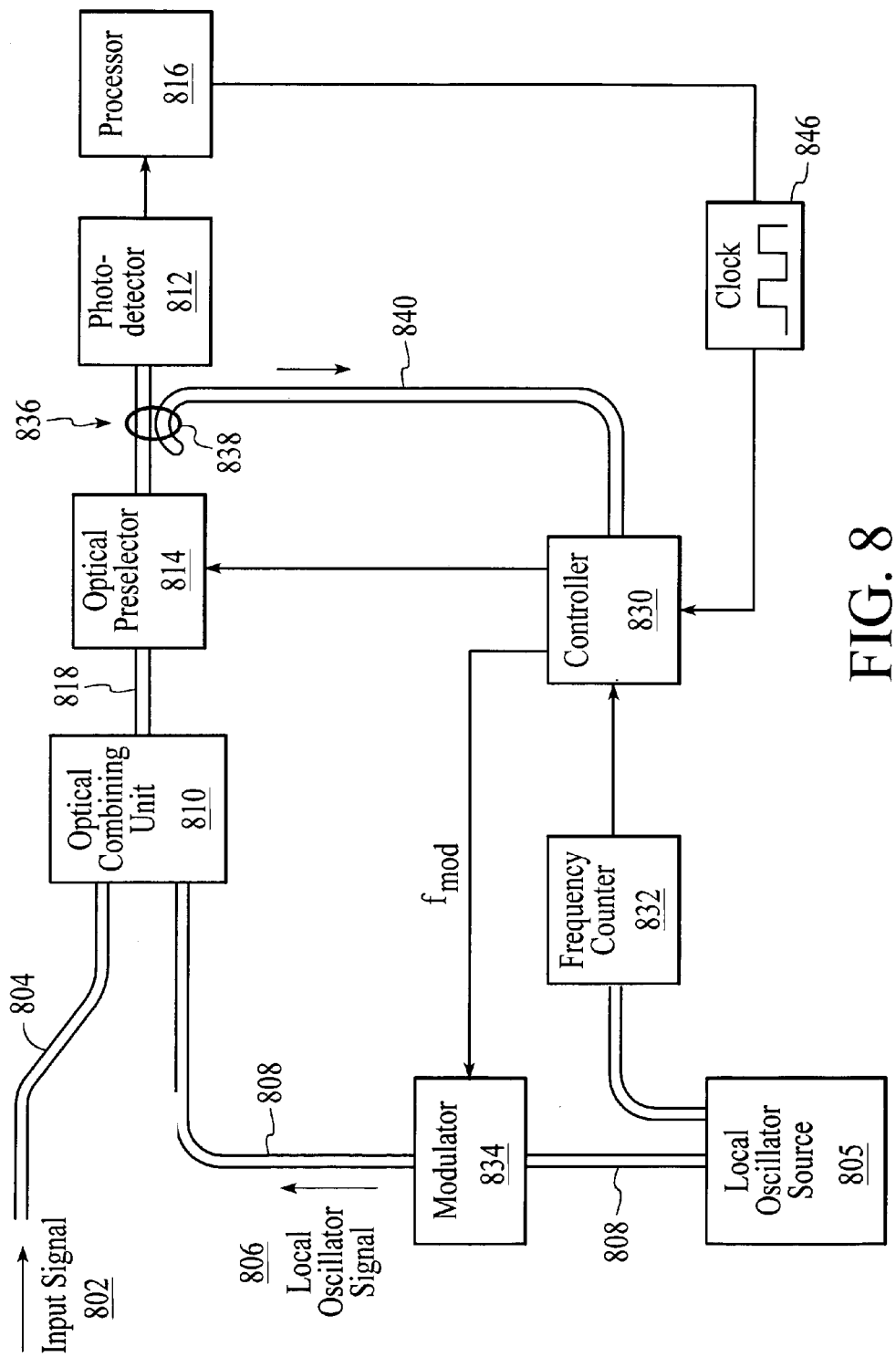
FIG. 8 is a depiction of the optical heterodyne detection system of FIG. 5 that includes a clock source in accordance with an embodiment of the invention.

In order to minimize leakage, into the photodetector, of the modulation sidebands of the modulated local oscillator signal, the frequency tracking process and the optical filtering process can be separated in time. FIG. 8 is a depiction of the optical heterodyne detection system of FIG. 5 that has been modified to include a clock source 846. The clock source provides a clock signal to the controller 830 and to the processor 816 such that the controller and the processor are synchronized to the same clock signal. In operation, the modulation signals fed to the modulator 834 and the processor are gated on and off in an alternating manner such that the modulation signal is applied to the modulator while the processor is gated off and visa versa. Alternatively, the processor may be programmed to separate signals received while the swept local oscillator signal is modulated from signals received while the swept local oscillator signal is not modulated. Either way, the frequency tracking function is carried out while the local oscillator signal is modulated and optical spectrum analysis of the input signal is carried out while the swept local oscillator signal is not modulated. In an alternative embodiment, optical gating may be utilized in place of electrical gating to accomplish the same outcome.

Figure 9:
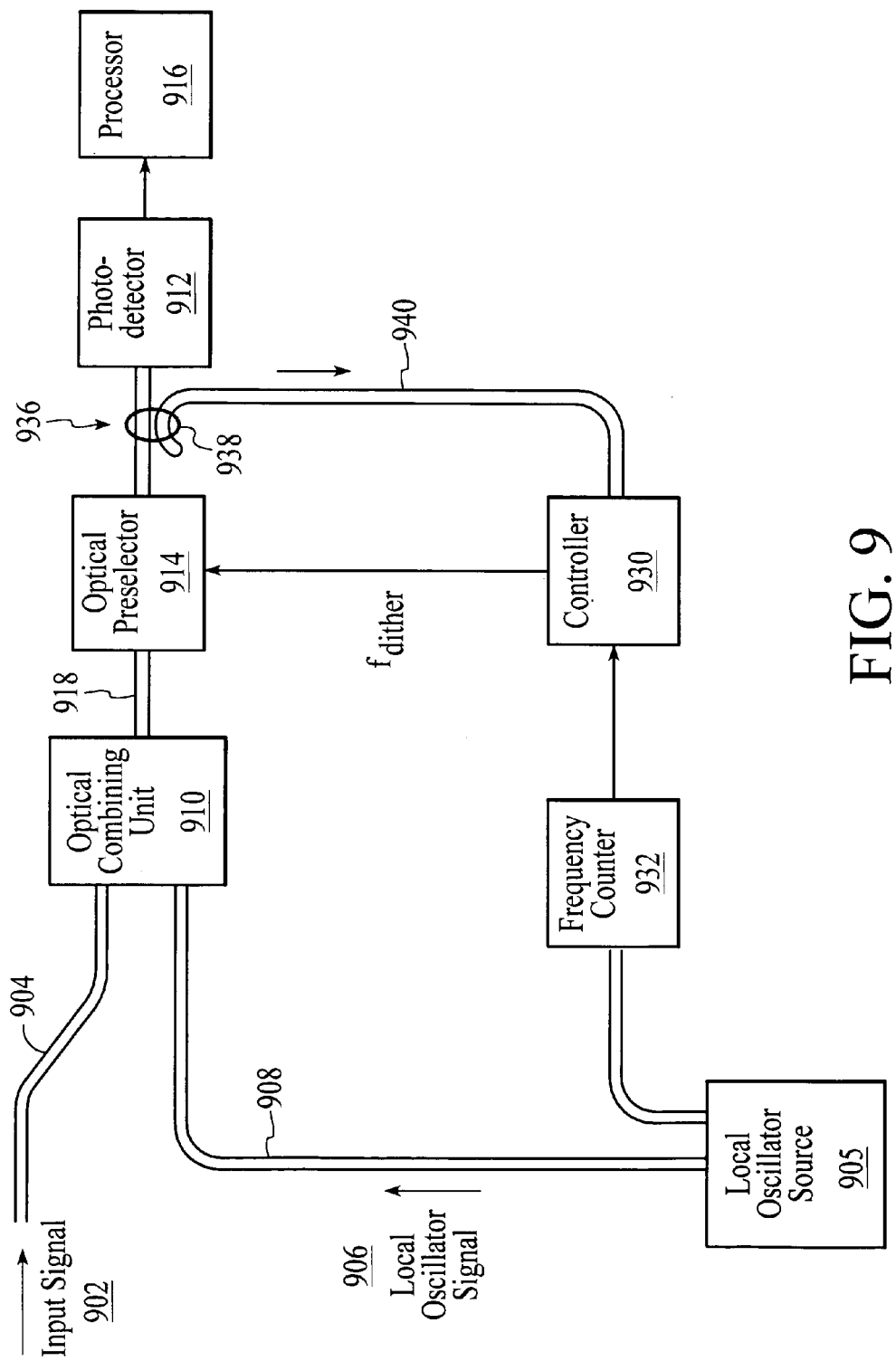
FIG. 9 is a depiction of the optical heterodyne detection system of FIG. 2 with an embodiment of a frequency tracking system that utilizes dithering of the optical pre-selector to determine the offset between the center frequency of the optical pre-selector and the frequency of the swept local oscillator in accordance with an embodiment of the invention.
Figure 10:
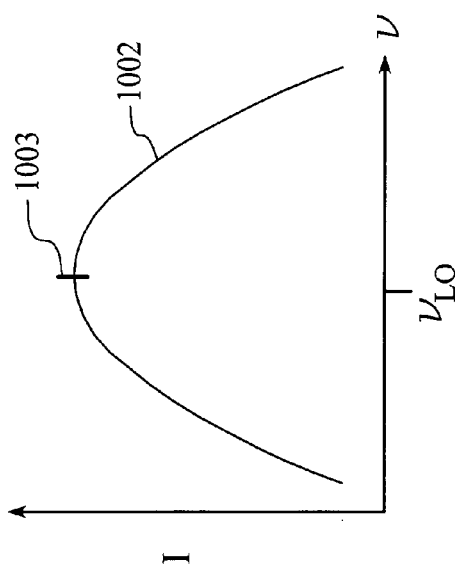
FIG. 10 is a graph of the intensity of a tapped portion of the optical signal from the optical pre-selector of FIG. 9 versus the frequency of the swept local oscillator signal.

FIG. 9 is a depiction of the optical heterodyne detection system of FIG. 2 with another embodiment of a frequency tracking system that utilizes modulation of the optical pre-selector 914 to identify the center frequency of the optical pre-selector instead of direct modulation of the swept local oscillator signal 906. The frequency tracking system depicted in FIG. 9 includes a controller 930, a frequency counter 932, and an optical signal tap 936. The controller, the frequency counter, and the optical signal tap are similar to those described above with reference to FIG. 5 and therefore the descriptions provided above with reference to FIG. 5 apply. The frequency tracking system of FIG. 9 involves modulating (also referred to as dithering) the center frequency of the optical pre-selector passband so that the intensity of the tapped optical signal received by the controller can be compared to the frequency of the swept local oscillator signal, ($V_{LO}$), as shown in FIG. 10. Dithering of the optical pre-selector can be accomplished by modulating the drive voltage applied to the optical pre-selector. As described above with reference to FIG. 6, the high point in the intensity versus optical frequency curve 1002 shown in FIG. 10 indicates the actual center frequency (or passband) of the optical pre-selector.

In operation, the swept local oscillator signal 906 is combined with the input signal as described above with reference to FIG. 2 and the combined optical signal is input into the optical pre-selector 914. Referring to FIG. 9, the controller 930 transmits a dithered drive signal to the optical pre-selector which causes the center frequency of the optical pre-selector to dither. Dithering of the center frequency of the optical pre-selector imparts a dither on the filtered portion of the combined optical signal that is output from the optical pre-selector. A portion of the filtered optical signal that is output from the optical pre-selector is tapped off from the output fiber by the optical signal tap 936 and directed to the controller. The controller utilizes the tapped off and dithered portion of the filtered optical signal to cause the center frequency of the optical pre-selector to be aligned with the frequency of the local oscillator signal. In the embodiment of FIG. 9, the controller determines the amplitude and phase offset between the detected dither signal and the dither control signal to generate an error signal. The error signal is added to the coarse tuning signal from the frequency counter 932. Adding the error signal to the coarse tuning signal forces the error signal between the optical pre-selector and the local oscillator signal to be small.

The controller 930 utilizes information related to the real-time frequency of the swept local oscillator signal from the frequency counter 932 and the tapped off signal in fiber 940 to adjust the center frequency of the optical pre-selector to track the frequency of the swept local oscillator signal. In an embodiment, the measure of the swept local oscillator frequency from the frequency counter is utilized by the controller for coarse tuning of the optical pre-selector and the control signal generated in response to the tapped off signal is utilized by the controller for fine tuning of the optical pre-selector.

Figure 11:
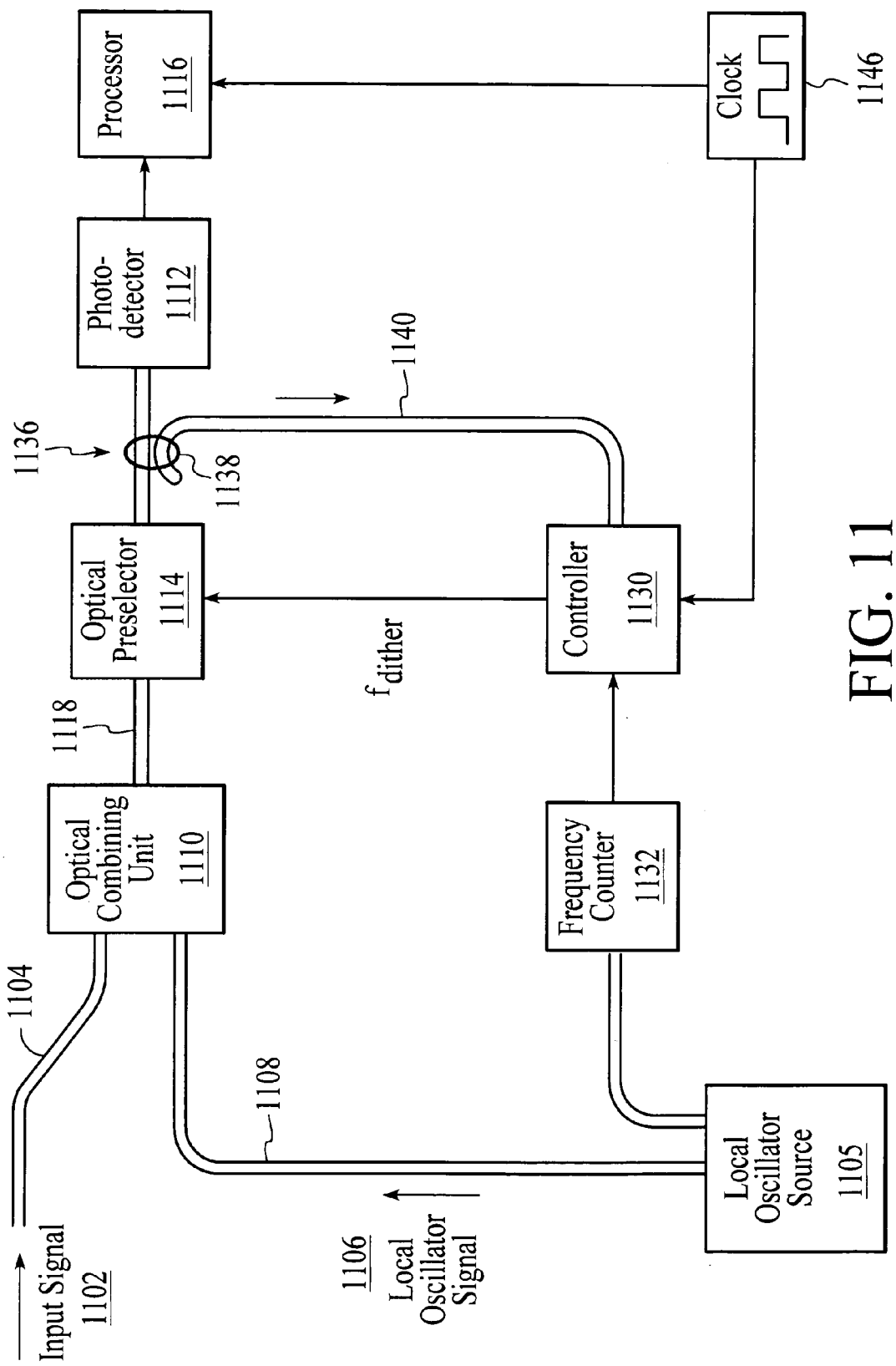
FIG. 11 is a depiction of the optical heterodyne detection system of FIG. 9 that includes a clock source in accordance with an embodiment of the invention.

FIG. 11 is a depiction of the optical heterodyne detection system of FIG. 9 that has been modified to include a clock source 1146 similar to the modification described with reference to FIG. 8. The clock source provides a clock signal to the controller 1130 and to the processor 1116 so that the optical pre-selector 1114 can be dithered in synchronization with the processor. In operation, the controller causes the pre-selector to dither during specified time intervals and the processor is gated off during the time intervals in which the pre-selector is dithered. That is, the frequency tracking function is carried out while the optical pre-selector is dithered and the processor is gated off, and optical spectrum analysis of the input signal is carried out while the optical pre-selector is not dithered and the processor is gated on.

Figure 12:
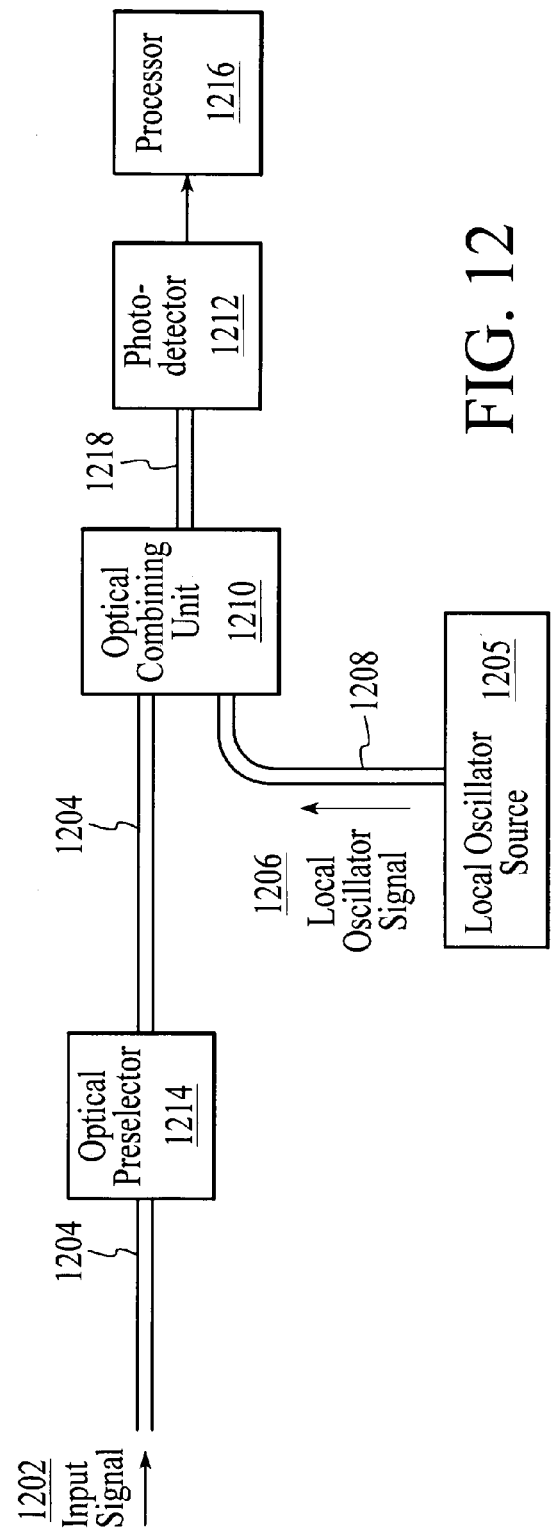
FIG. 12 is a depiction of an optical heterodyne detection system that includes an optical pre-selector, an optical combining unit, and a photodetector where an input signal is optically filtered before being combined with a swept local oscillator signal.

FIG. 12 depicts an embodiment of an optical heterodyne detection system in which the input signal 1202 is filtered before the input signal is combined with a swept local oscillator signal 1206. In contrast to the optical heterodyne detection system of FIG. 2, the optical pre-selector is located along an optical path that is before the optical combining unit and filters only the input signal. The optical heterodyne detection system of FIG. 12 includes the input signal, a signal fiber 1204, an optical pre-selector 1214, a local oscillator source 1205, the local oscillator signal, a local oscillator fiber 1208, an optical combining unit 1210, a photodetector 1212, and a processor 1216. Although the optical pre-selector is located before the optical combining unit, the description of the individual elements is similar to the descriptions provided above with reference to FIGS. 2–4.

Operation of the optical heterodyne detection system described with reference to FIG. 12 involves filtering the input signal 1202 with the optical pre-selector 1214 before the input signal is combined with the local oscillator signal 1206. The optical pre-selector passes the filtered input signal in a frequency band that tracks the swept local oscillator signal. The filtered input signal is combined with the swept local oscillator signal to generate a combined optical signal. A beam of the combined optical signal is then detected by the photodetector 1212 and the photodetector generates an electrical signal in proportion to the intensity of the beam. The electrical signal generated by the photodetector is then received by the processor 1216 and processed to determine an optical characteristic represented by the input signal. The combination of the optical pre-selector, the optical combining unit, and the photodetector creates an optical heterodyne detection system that filters the input signal before it is combined with the swept local oscillator signal to reduce noise and improve the dynamic range of the system. Preferably, during operation, the center frequency of the optical pre-selector passband tracks, in real-time, the frequency of the swept local oscillator signal.

Figure 13:
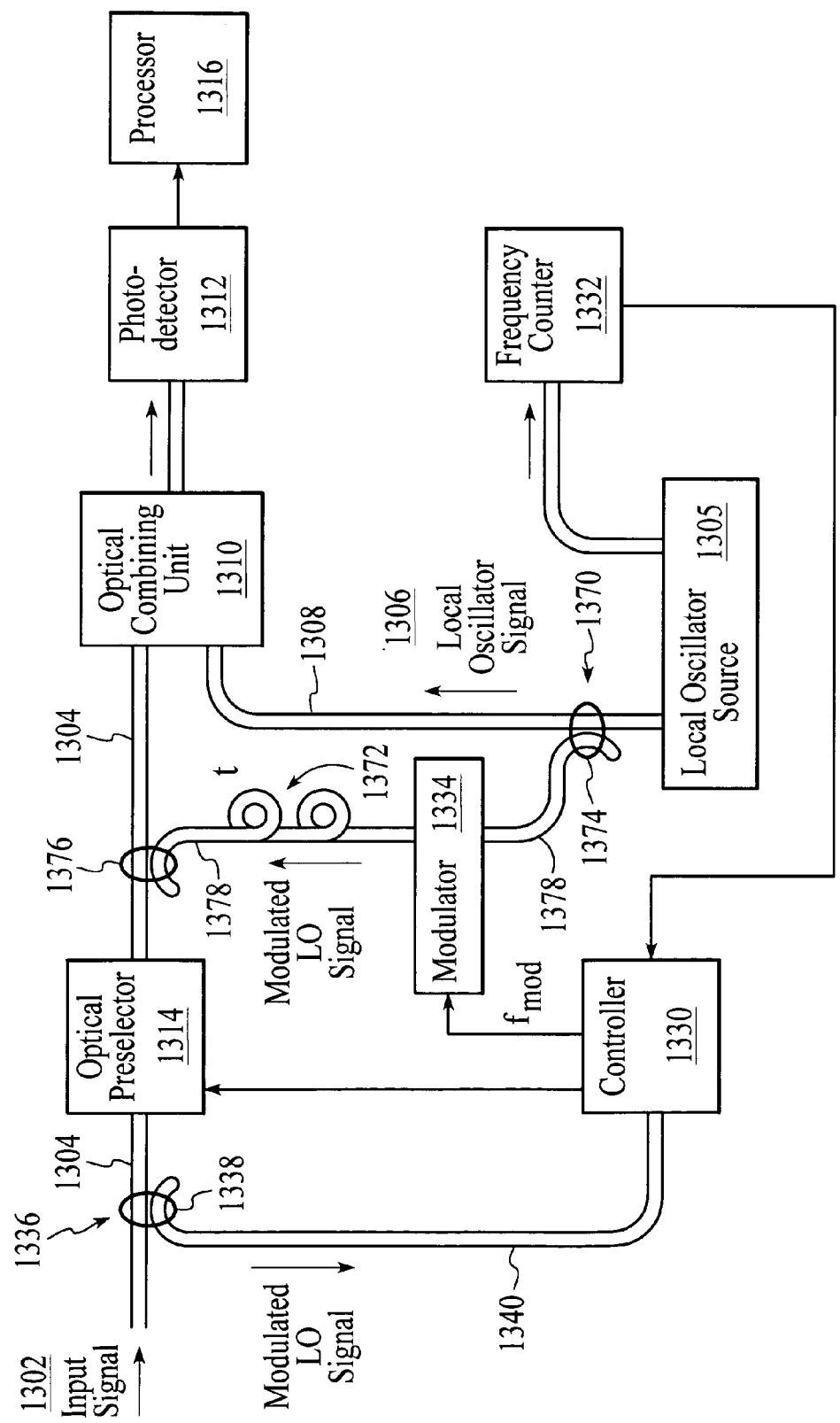
FIG. 13 is a depiction of the optical heterodyne detection system of FIG. 12 with an embodiment of a frequency tracking system that utilizes modulation of a portion of the swept local oscillator signal in combination with a signal delay to control the optical pre-selector in accordance with an embodiment of the invention.

FIG. 13 is a depiction of the optical heterodyne detection system of FIG. 12 with a frequency tracking system that utilizes modulation of a portion of the swept local oscillator signal to track the center frequency of the optical pre-selector. The frequency tracking system includes a controller 1330, a frequency counter 1332, a first optical signal tap 1370, a modulator 1334, a signal delay unit 1372, and a second optical signal tap 1336. Each element of the frequency tracking system is described individually below followed by a description of the system operation relative to the operation of the overall optical heterodyne detection system.

The controller 1330 is operationally connected to control the center frequency of the passband of the optical pre-selector 1314 such that the passband tracks the frequency of the swept local oscillator. The controller is connected to receive frequency information from the frequency counter and the tapped portion of the local oscillator signal from the second optical signal tap. The controller is connected to transmit frequency control signals ($f_{mod}$) to the modulator and a filter control signal to the optical pre-selector.

The frequency counter 1332 is optically connected to measure the frequency (alternatively referred to in terms of wavelength) of the swept local oscillator signal. Preferably, the frequency counter obtains a real-time measure of the frequency of the local oscillator signal as the local oscillator signal sweeps across a range of frequencies. The frequency counter outputs frequency measurement information, through an electrical connection, to the controller 1330 for use in frequency tracking.

The first optical signal tap 1370 is located between the local oscillator source 1305 and the optical combining unit 1310. The first optical signal tap diverts a portion of the swept local oscillator signal through the optical pre-selector 1314 in a direction that is opposite to the transmission of the input signal 1302. The first optical signal tap includes a coupler 1374 on the local oscillator fiber 1308, a coupler 1376 on the input fiber after the optical pre-selector, and a first optical tap fiber 1378 between the two couplers.

The modulator 1334 is located along the first optical tap fiber in the optical path of the tapped portion of the swept local oscillator signal. The modulator directly modulates the tapped portion of the swept local oscillator signal in response to a modulation signal from the controller. In a preferred embodiment, the modulator is a phase modulator that modulates the tapped portion of the swept local oscillator signal at a known modulation frequency ($f_{mod}$) that is substantially greater than the bandwidth of the photodetector and its associated receiver electronics.

The signal delay unit 1372 is located along the first optical tap fiber 1378. The signal delay unit imparts a delay of time t, on the tapped portion of the swept local oscillator signal. Optical signal delay units, such as fiber delay lines, are known in the field of optical communications and are not described further.

The second optical signal tap 1336 is located along the input optical fiber 1304 before the optical pre-selector 1314. The second optical signal tap diverts a portion of the modulated and delayed local oscillator signal and directs the tapped portion of the modulated and delayed local oscillator signal to the controller 1330. In an embodiment, the second optical signal tap includes an optical coupler 1338 and a second optical tap fiber 1340. As will become evident, the second optical signal tap is located before (with respect to the transmission direction of the input signal) the optical pre-selector when the pre-selector operates in a transmissive mode for the frequency tracking function, however the second optical signal tap may be located after the optical pre-selector if the optical pre-selector operates in a reflective mode for the frequency tracking function.

In operation, the controller 1330 transmits a frequency control signal to the modulator 1334 which causes the tapped portion of the swept local oscillator signal to be modulated at a frequency $f_{mod}$. The modulated portion of the swept local oscillator signal is then directed through the signal delay unit 1372 which imparts a delay of time t on the modulated portion of the swept local oscillator signal. The modulated and delayed portion of the swept local oscillator signal is then directed through the optical pre-selector 1314 in a direction that is opposite to the transmission direction of the input signal 1302. A portion of the modulated and delayed swept local oscillator signal that is output from the optical pre-selector is tapped off from the input fiber at the second optical signal tap 1336 and directed to the controller. Simultaneous with the tapped portion of the swept local oscillator signal, the untapped portion of the swept local oscillator signal is combined with the filtered input signal as described above with reference to FIG. 12 and the combined optical signal is output to the photodetector 1312.

Figure 14:
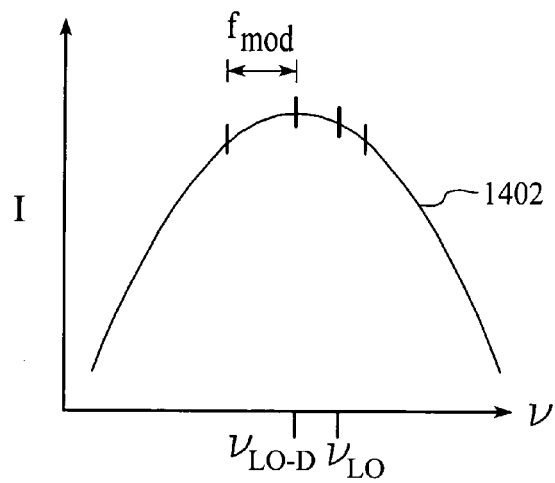
FIG. 14 is a graph of the intensity of a tapped portion of the dithered optical signal from the optical pre-selector of FIG. 13 versus the frequency of the swept local oscillator signal.

Referring to FIG. 14, the controller measures the intensity of the tapped off portion of the modulated and delayed local oscillator signal that has passed through the optical pre-selector and detects any offset between the optical frequency of the delayed local oscillator signal and the center frequency of the optical pre-selector. The controller applies a control signal to the optical pre-selector that minimizes the offset between the optical frequency of the delayed local oscillator signal and the center frequency of the optical pre-selector. Minimizing the offset between optical frequency of the delayed local oscillator signal and the center frequency of the optical pre-selector causes the optical pre-selector to track the delayed local oscillator signal. The frequency of the swept local oscillator signal is indicated as $V_{LO}$ and the frequency of the delayed portion of the swept local oscillator signal is indicated as $V_{LO\text{-}D}$. Taking into consideration the sweep rate of the local oscillator signal and the delay time, t, the offset between $V_{LO}$ and $V_{LO\text{-}D}$ can be determined.

Referring to FIG. 14, in a preferred embodiment, the offset between the frequency of the swept local oscillator signal ($V_{LO}$) and the frequency of the delayed portion of the swept local oscillator signal ($V_{LO\text{-}D}$) is greater than the photodetector bandwidth and the modulation frequency ($f_{mod}$) is greater than the photodetector bandwidth such that the swept local oscillator signal at $V_{LO\text{-}D}$ and its sidebands are not picked up by the photodetector 1312. The above-described frequency ranges minimize the noise that is contributed from leakage of the modulated portion of the swept local oscillator signal into the photodetector.

The controller 1330 utilizes information related to the real-time frequency of the swept local oscillator signal from the frequency counter 1332 and the detected offset between the center frequency of the optical pre-selector 1314 and the frequency of the local oscillator signal to adjust the center frequency (or passband) of the optical pre-selector to track the frequency of the swept local oscillator signal. In an embodiment, the measure of the swept local oscillator signal frequency from the frequency counter is utilized by the controller for coarse tuning of the optical pre-selector and the tapped off portion of the local oscillator signal from the optical pre-selector is utilized in a feedback loop for fine tuning of the optical pre-selector.

Figure 15:
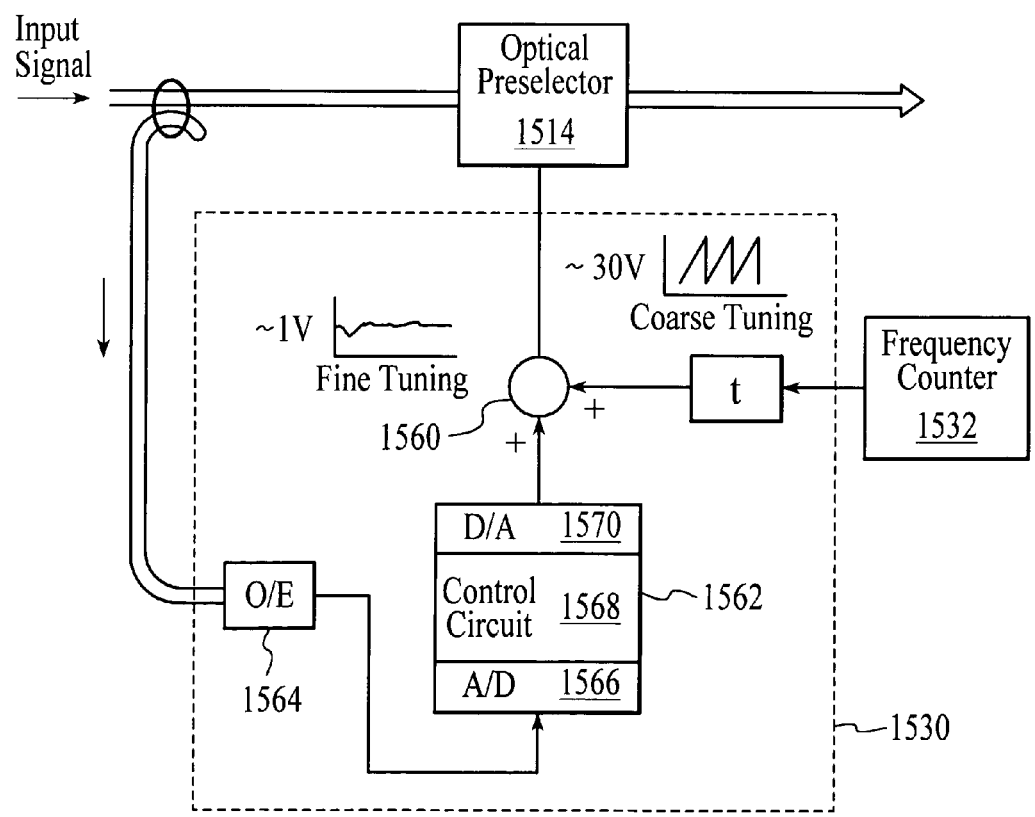
FIG. 15 is an expanded depiction of an embodiment of the controller shown in FIG. 13.

FIG. 15 is an expanded depiction of an embodiment of the controller described with reference to FIG. 13. The controller 1530 includes a summing node 1560, a fine tuning controller 1562, and an optical-to-electrical converter 1564 which form a feedback tracking circuit. The optical-to-electrical converter converts the tapped portion of the modulated and delayed local oscillator signal into an electrical signal. The fine tuning controller includes an analog-to-digital converter 1566, a control circuit 1568, and a digital-to-analog converter 1570 that are used to determine the amplitude and phase of the optical signal and to determine the offset between the center frequency of the pre-selector and the frequency of the local oscillator signal. An error signal representative of the offset between the center frequency of the pre-selector and the frequency of the local oscillator signal is added to the coarse tuning control signal form the frequency counter at the summing node. Taking into consideration the delay time, t, the optical pre-selector can be accurately tuned in real-time, or nearly real-time, to track the frequency (or wavelength) of the swept local oscillator signal. In the embodiment of FIG. 15, the frequency counter provides information for coarse tuning that is on the order of 30 volts and the modulated and delayed portion of the optical signal provides information for fine tuning that is on the order of 1 volt.

Figure 16:
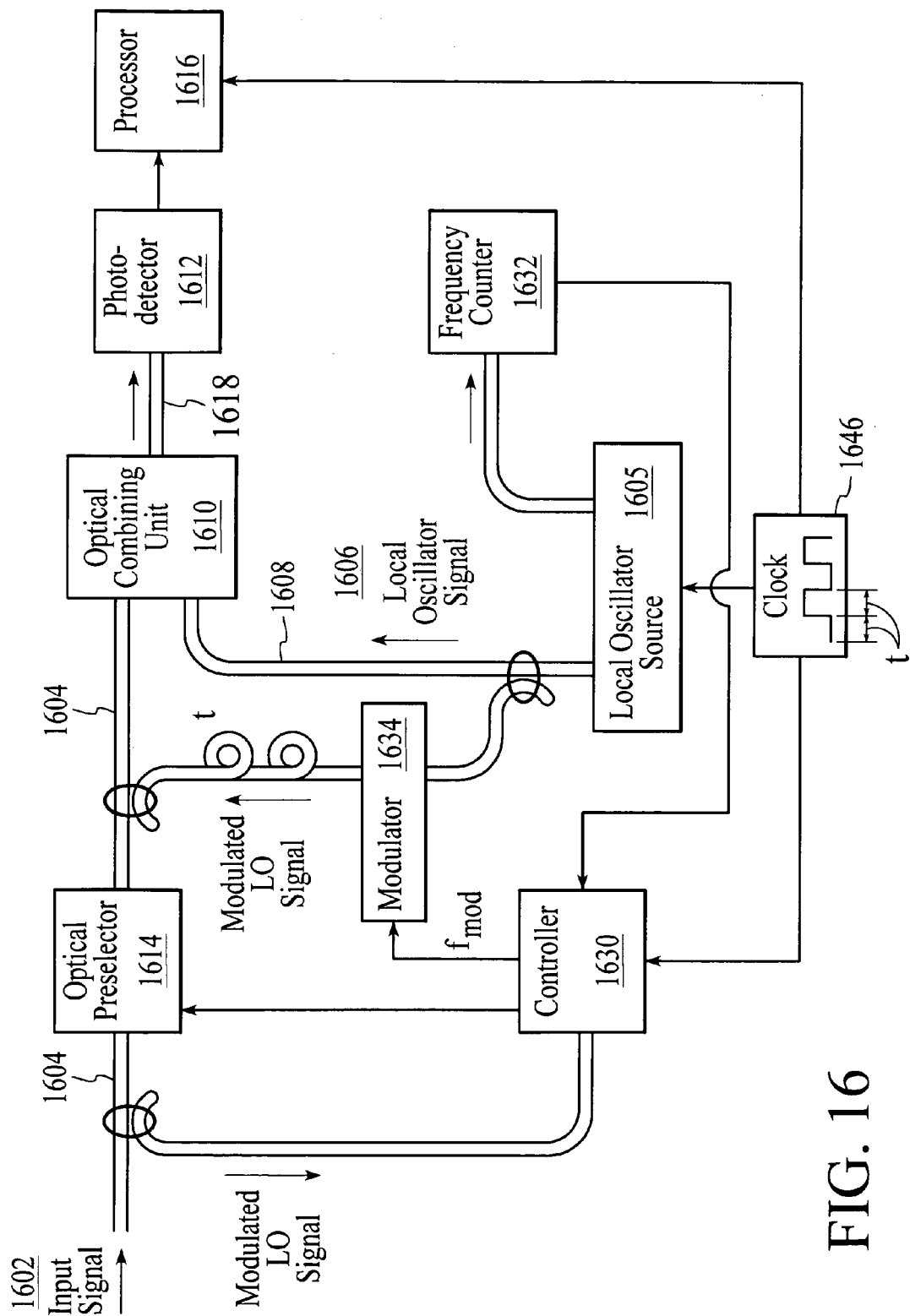
FIG. 16 is a depiction of the optical heterodyne detection system of FIG. 13 that includes a clock source in accordance with an embodiment of the invention.

In an alternative embodiment for minimizing noise that may be generated by leakage of the modulated local oscillator signal into the photodetector, the frequency tracking process and the optical filtering process can be separated in time. FIG. 16 is a depiction of the optical heterodyne detection system of FIG. 13 that has been modified to include a clock source 1646. The clock source provides a clock signal to the controller 1630, the local oscillator source 1605, and the processor 1616 such that the controller, the local oscillator source, and the processor are synchronized to the same clock signal. In an embodiment, the clock signal has a period of twice the delay time, t. In operation, the local oscillator source and the processor are gated on and off for a time t during each clock period of the clock signal. Since the signal delay time t is one half of the clock period, the locking signal at frequency $V_{LO\text{-}D}$ is injected into the pre-selector and utilized by the controller for frequency tracking when the local oscillator source and the processor are off and visa versa. Alternatively, the processor may be programmed to separate the signal that is received while the local oscillator source is gated on from the signal that is received while the local oscillator source is gated off. Either way, the frequency tracking function is carried out while the local oscillator source is gated off and optical spectrum analysis of the input signal is carried out while the local oscillator source is gated on.

Figure 17:
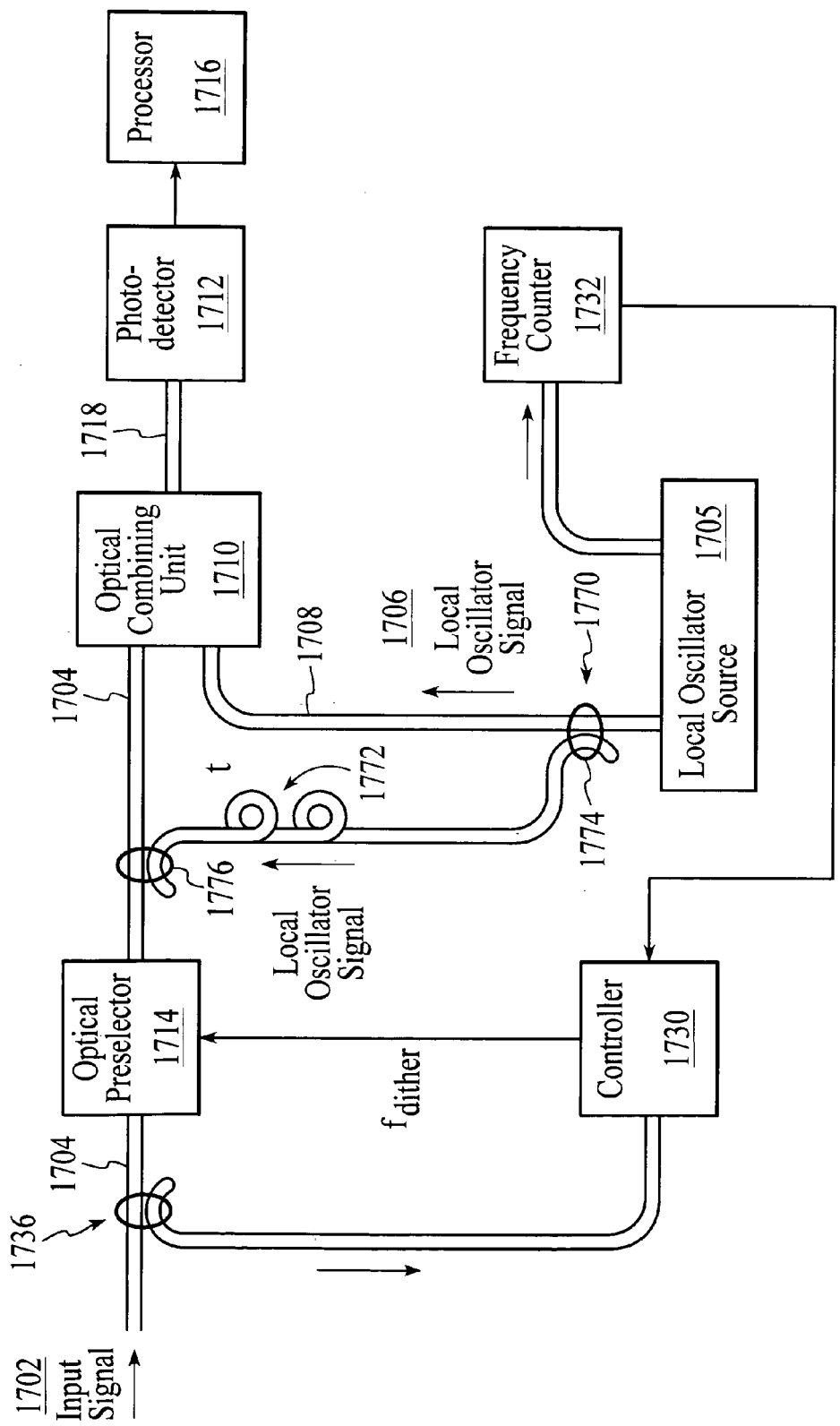
FIG. 17 is a depiction of the optical heterodyne detection system of FIG. 12 with an embodiment of a frequency tracking system that utilizes dithering of the optical pre-selector in combination with a signal delay to control the optical pre-selector in accordance with an embodiment of the invention.
Figures 18, 20A, 20B:
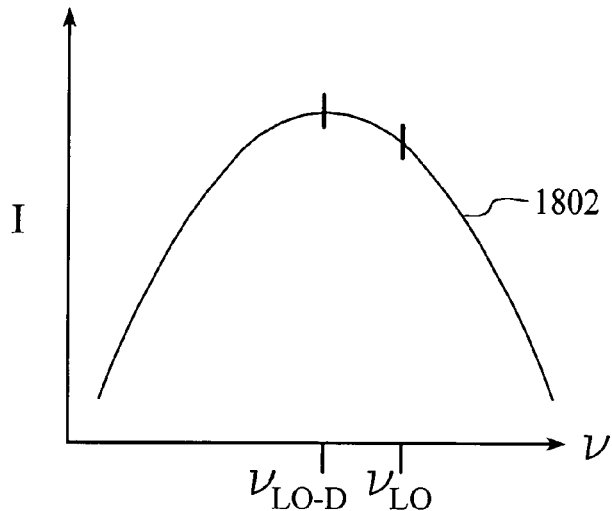
FIG. 18 is a graph of the intensity of a tapped portion of the dithered optical signal from the optical pre-selector of FIG. 17 versus the frequency of the swept local oscillator signal.
FIG. 20A includes an additional step in the process flow diagram of FIG. 20 in accordance with an embodiment of the invention.
FIG. 20B includes an additional description of the filtering step of FIG. 20 in accordance with an embodiment of the invention.

FIG. 17 is a depiction of the optical heterodyne detection system of FIG. 12 with another embodiment of a frequency tracking system that utilizes modulation (also referred to as dithering) of the optical pre-selector 1714 to determine the center frequency of the optical pre-selector passband instead of direct modulation of the swept local oscillator signal. The frequency tracking system includes a controller 1730, a frequency counter 1732, a first optical signal tap 1770, a signal delay unit 1772, and a second optical signal tap 1736. The controller, the frequency counter, the first optical signal tap, the signal delay unit, and the second optical signal tap are similar to those described above with reference to FIG. 13 and therefore the descriptions provided above with reference to FIG. 13 apply. The frequency tracking system of FIG. 17 involves modulating the center frequency of the optical pre-selector so that the intensity of the delayed portion of the local oscillator signal received by the controller can be related to the frequency of the swept local oscillator signal as shown in FIG. 18. As described above with reference to FIG. 14, taking into account the delay time of the swept local oscillator signal, the high point in the intensity versus 1802 frequency curve indicates the center frequency, or passband, of the optical pre-selector.

In operation, a portion of the swept local oscillator signal is tapped off from the swept local oscillator signal at the coupler 1774 of the first optical signal tap 1770. The tapped portion of the swept local oscillator signal is then directed through the signal delay unit 1772, which imparts a delay of time t on the tapped portion of the swept local oscillator signal. The delayed portion of the swept local oscillator signal is then directed through the optical pre-selector in a transmission direction that is opposite to the direction of the input signal 1702. The controller 1730 transmits a dither control signal to the optical pre-selector which causes the center frequency of the optical pre-selector to dither. Dithering of the center frequency of the optical pre-selector imparts a dither on the delayed portion of the swept local oscillator signal that is directed through the optical pre-selector. A portion of the filtered and delayed local oscillator signal that is output from the optical pre-selector is tapped off from the input fiber 1704 at the second optical signal tap 1736 and directed to the controller. The controller utilizes the tapped portion of the filtered and delayed local oscillator signal as described above with reference to FIG. 9 to cause the center frequency of the optical pre-selector to track the frequency of the swept local oscillator signal. Simultaneous with the tapped portion of the swept local oscillator signal, the untapped portion of the swept local oscillator signal is combined with the filtered input signal as described above with reference to FIG. 12 and the combined optical signal is output to the photodetector.

Referring to FIG. 18, in a preferred embodiment, the offset between the frequency of the swept local oscillator signal ($V_{LO}$) and the frequency of the delayed portion of the swept local oscillator signal ($V_{LO\text{-}D}$) is greater than the photodetector bandwidth and the modulation frequency ($f_{mod}$) is greater than the photodetector bandwidth such that the swept local oscillator signal at $V_{LO\text{-}D}$ is not picked up by the photodetector 1712. The above-described frequency ranges minimize the noise that is contributed from leakage of the modulated portion of the swept local oscillator signal into the photodetector.

Figure 19:
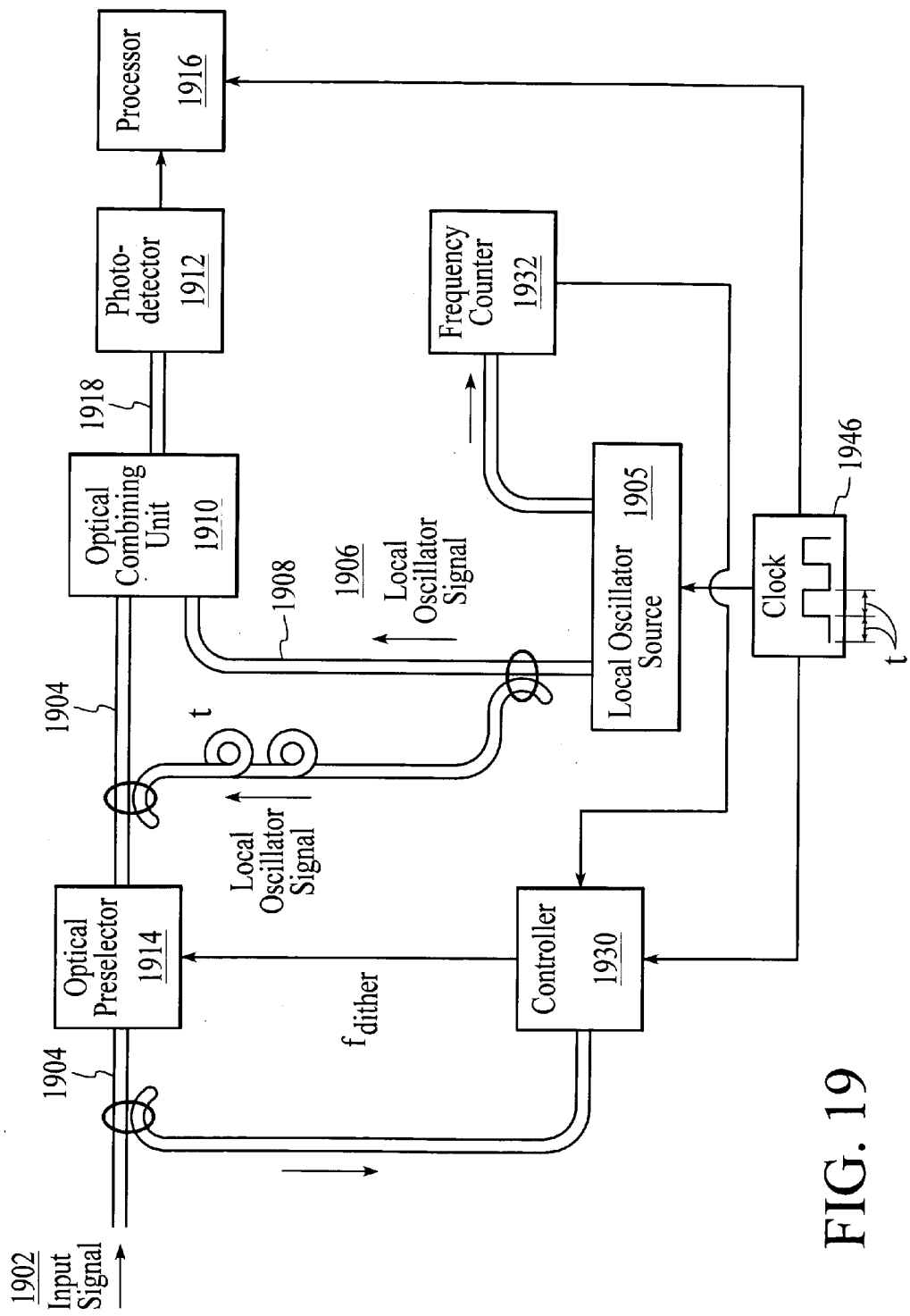
FIG. 19 is a depiction of the optical heterodyne detection system of FIG. 17 that includes a clock source in accordance with an embodiment of the invention.

In an alternative embodiment for minimizing noise from the dither signal that may leak into the photodetector, the frequency tracking process and the optical filtering process can be separated in time. FIG. 19 is a depiction of the optical heterodyne detection system of FIG. 17 that has been modified to include a clock source 1946. The clock source provides a clock signal to the controller 1930, the local oscillator source 1905, and the processor 1916 such that the controller, the local oscillator source, and the processor are synchronized to the same clock signal. In operation, the local oscillator source and the processor are gated on and off for time t during each clock period of the clock signal. Since the signal delay time t is one half of the clock period, the locking signal at frequency $f_{LO\text{-}D}$ is injected into the pre-selector and the optical pre-selector is dithered when the local oscillator source and the processor are off and visa versa. Alternatively, the processor may be programmed to separate the signal that is received while the local oscillator source is gated on from the signal that is received while the local oscillator source is gated off and the optical pre-selector is dithered. Either way, the frequency tracking function is carried out while the local oscillator source is gated off and optical spectrum analysis of the input signal is carried out while the local oscillator source is gated on.

Figure 20:
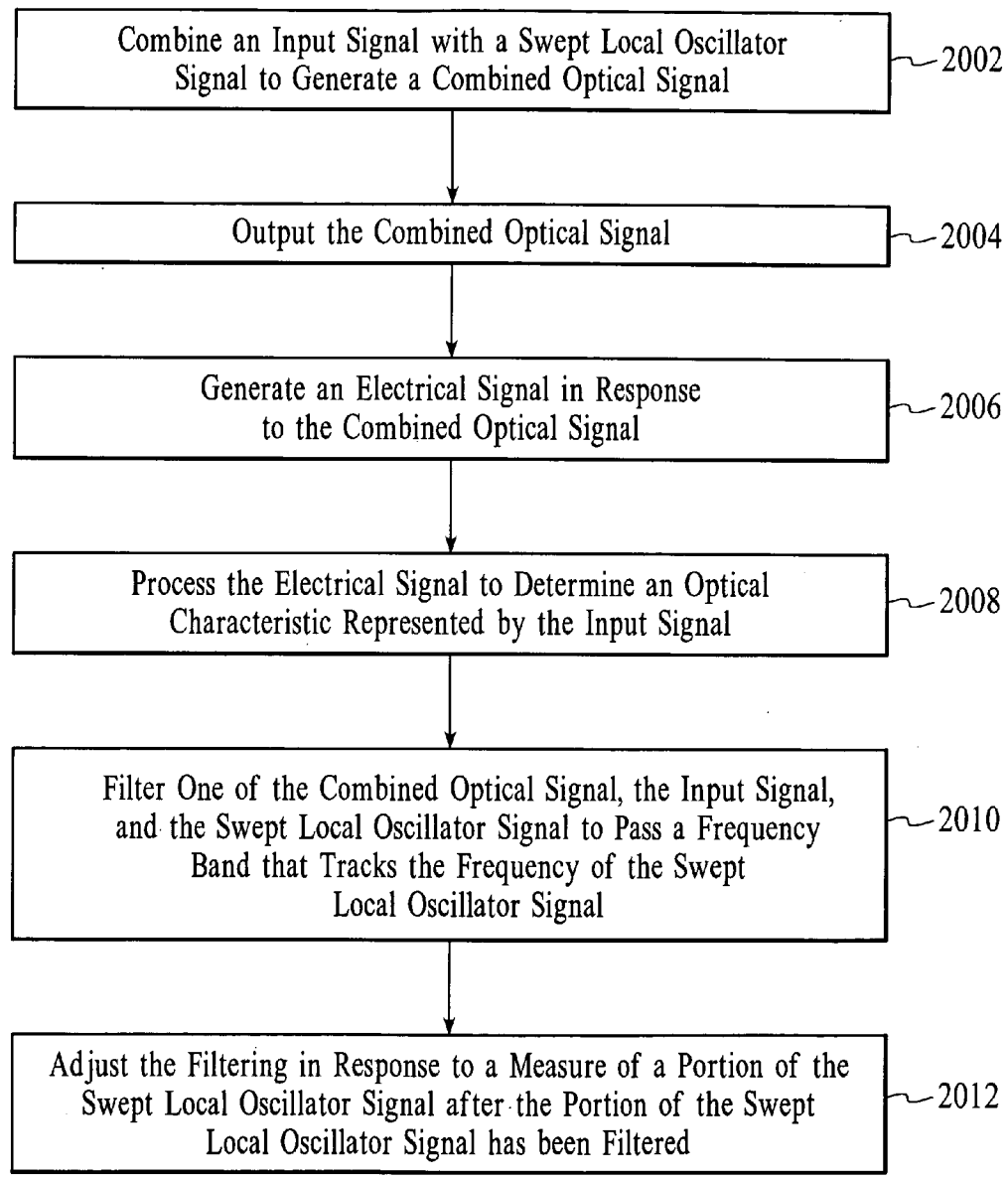
FIG. 20 is a process flow diagram of a method for monitoring an input signal utilizing optical heterodyne detection in accordance with an embodiment of the invention.

A method for monitoring an optical signal utilizing an optical heterodyne detection system with optical pre-selection is described herein and depicted in the process flow diagram of FIG. 20. In a step 2002, the input signal is combined with the swept local oscillator signal to generate a combined optical signal. In a step 2004, the combined optical signal is output. In a step 2006, an electrical signal is generated in response to the combined optical signal. In a step 2008, the electrical signal is processed to determine an optical characteristic represented by the input signal. In a step 2010, one of the combined optical signal, the input signal, and the swept local oscillator signal is filtered to pass a frequency band that tracks the frequency band of the swept local oscillator signal. In a step 2012, the filtering is adjusted in response to a measure of the frequency of the swept local oscillator signal and in response to a measure of a portion of the swept local oscillator signal after the portion of the swept local oscillator signal has been filtered.

In an embodiment as shown in FIG. 20A, the method for monitoring includes an additional step 2014 of modulating at least some portion of the swept local oscillator signal.

In another embodiment of the method for monitoring as shown in FIG. 20B, the step 2010 of filtering includes a step 2016 of dithering a filter passband for one of the combined optical signal, the input signal, and the swept local oscillator signal.

Although not depicted in the systems of FIGS. 2, 6, 8, and 9, an optical pre-selector that tracks the frequency of the swept local oscillator signal may alternatively be applied to the swept local oscillator signal itself in order to minimize noise that may be present in the local oscillator signal.

The invention claimed is:

1. A system for optical heterodyne detection comprising:
   a first optical path for carrying an input signal;
   a second optical path for carrying a swept local oscillator signal;
   optical combining means for combining said input signal and said swept local oscillator signal into a combined optical signal;
   a third optical path for carrying said combined optical signal;
   a photodetector optically arranged to receive said combined optical signal from said third optical path, said photodetector generating an electrical signal in response to said combined optical signal;
   an optical pre-selector optically arranged to filter an optical signal within one of said first, second, and third optical paths, said optical pre-selector having a passband that tracks the frequency of said swept local oscillator signal, said optical pre-selector outputting a filtered portion of said optical signal;
   means for adjusting said optical pre-selector passband in response to a measure of the frequency of said swept local oscillator signal and in response to a measure of a portion of said swept local oscillator signal after said portion of said swept local oscillator signal has optically interacted with said optical pre-selector, said optical pre-selector passband being adjusted to track the frequency of said swept local oscillator signal; and
   a phase modulator for modulating at least some portion of said swept local oscillator signal, said phase modulator being responsive to said means for adjusting and being located along an optical path that is before said optical pre-selector.

2. The system of claim 1 further including means for measuring the frequency of said swept local oscillator signal in real-time, said means for measuring having an output for outputting said measure of said swept local oscillator signal to said adjusting means.

3. The system of claim 1 further including a clock source for controlling the timing of signal modulation caused by said phase modulator.

4. The system of claim 1 wherein said optical pre-selector is optically arranged to filter said combined optical signal within said third optical path.

5. The system of claim 4 further including means, located optically between said optical combining means and said photodetector, for tapping a portion of said combined optical signal and for forwarding said tapped portion of said combined optical signal to said adjusting means, said tapped portion of said combined optical signal including said portion of said swept local oscillator signal.

6. The system of claim 1 wherein said optical pre-selector is optically arranged to filter said input signal within said first optical path.

7. The system of claim 6 further including means for tapping said portion of said swept local oscillator signal from said second optical path, passing said portion of said swept local oscillator signal through said phase modulator, delaying said portion of said swept local oscillator signal, and interacting said portion of said swept local oscillator signal with said optical pre-selector.

* * * * *